United States Patent
Gruber

(10) Patent No.: US 9,087,409 B2
(45) Date of Patent: Jul. 21, 2015

(54) TECHNIQUES FOR REDUCING MEMORY ACCESS BANDWIDTH IN A GRAPHICS PROCESSING SYSTEM BASED ON DESTINATION ALPHA VALUES

(75) Inventor: Andrew Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/409,993

(22) Filed: Mar. 1, 2012

(65) Prior Publication Data

US 2013/0229414 A1    Sep. 5, 2013

(51) Int. Cl.
  *G06T 15/40*    (2011.01)

(52) U.S. Cl.
  CPC ............ *G06T 15/40* (2013.01); *G06T 2200/28* (2013.01)

(58) Field of Classification Search
  CPC ........... G09G 5/393; G09G 5/39; G09G 5/14; G09G 5/026; G09G 5/024; G09G 5/234; G09G 5/363; G06T 1/60; G06T 15/40; G06T 11/40; G06T 15/04; G06F 3/017; G06F 13/10; G06F 13/12; A61B 8/00; A61B 8/44; G01S 7/003
  USPC ........................................................ 345/531
  See application file for complete search history.

(56) References Cited

U.S. PATENT DOCUMENTS

| | | | |
|---|---|---|---|
| 6,195,744 B1 * | 2/2001 | Favor et al. | 712/215 |
| 6,333,951 B1 * | 12/2001 | Tamura et al. | 375/240.25 |
| 6,614,444 B1 | 9/2003 | Duluk et al. | |
| 6,807,620 B1 | 10/2004 | Suzuoki et al. | |
| 6,879,328 B2 | 4/2005 | Deering | |
| 7,042,462 B2 | 5/2006 | Kim et al. | |
| 7,199,801 B2 | 4/2007 | Tsunashima et al. | |
| 7,450,123 B1 | 11/2008 | Kilgard | |
| 7,920,151 B2 | 4/2011 | MacInnis et al. | |
| 8,125,495 B2 | 2/2012 | Darsa et al. | |

(Continued)

FOREIGN PATENT DOCUMENTS

| | | |
|---|---|---|
| JP | H08272943 A | 10/1996 |
| JP | H08317284 A | 11/1996 |

(Continued)

OTHER PUBLICATIONS

International Search Report and Written Opinion—PCT/US2013/025375—ISA/EPO—Jun. 26, 2013, 10 pp.

(Continued)

*Primary Examiner* — Jason M Repko
*Assistant Examiner* — Kwang Lee
(74) *Attorney, Agent, or Firm* — Shumaker & Sieffert, P.A.

(57) ABSTRACT

This disclosure describes techniques for reducing memory access bandwidth in a graphics processing system based on destination alpha values. The techniques may include retrieving a destination alpha value from a bin buffer, the destination alpha value being generated in response to processing a first pixel associated with a first primitive. The techniques may further include determining, based on the destination alpha value, whether to perform an action that causes one or more texture values for a second pixel to not be retrieved from a texture buffer. In some examples, the action may include discarding the second pixel from a pixel processing pipeline prior to the second pixel arriving at a texture mapping stage of the pixel processing pipeline. The second pixel may be associated with a second primitive different than the first primitive.

44 Claims, 16 Drawing Sheets

(56) References Cited

U.S. PATENT DOCUMENTS

| | | |
|---|---|---|
| 8,196,049 B2 | 6/2012 | Liu et al. |
| 2002/0093516 A1 | 7/2002 | Brunner et al. |
| 2002/0149626 A1 | 10/2002 | Ozcelik et al. |
| 2002/0171682 A1 | 11/2002 | Frank et al. |
| 2004/0012609 A1* | 1/2004 | Taneja et al. ............... 345/611 |
| 2004/0085321 A1 | 5/2004 | Oka et al. |
| 2005/0168471 A1 | 8/2005 | Paquette |
| 2005/0195198 A1 | 9/2005 | Anderson et al. |
| 2005/0270297 A1 | 12/2005 | Munday et al. |
| 2005/0285850 A1 | 12/2005 | Heim et al. |
| 2006/0098021 A1* | 5/2006 | Rim et al. .................. 345/543 |
| 2006/0209078 A1 | 9/2006 | Anderson et al. |
| 2007/0009182 A1 | 1/2007 | Yamauchi |
| 2007/0040851 A1 | 2/2007 | Brunner et al. |
| 2007/0291189 A1 | 12/2007 | Harville |
| 2008/0001967 A1 | 1/2008 | Rengarajan et al. |
| 2008/0284798 A1 | 11/2008 | Weybrew et al. |
| 2009/0102857 A1* | 4/2009 | Kallio ....................... 345/611 |
| 2012/0050313 A1 | 3/2012 | Gruber |
| 2012/0154426 A1 | 6/2012 | Darsa et al. |
| 2012/0212506 A1 | 8/2012 | Liu et al. |
| 2012/0268475 A1* | 10/2012 | Hancock ..................... 345/589 |

FOREIGN PATENT DOCUMENTS

| | | |
|---|---|---|
| JP | H10333869 A | 12/1998 |
| JP | 2002544544 A | 12/2002 |
| JP | 2008259605 A | 10/2008 |
| JP | 2009193089 A | 8/2009 |
| WO | 0068887 A1 | 11/2000 |

OTHER PUBLICATIONS

Response to Written Opinion dated Jun. 26, 2013, from International Application No. PCT/US2013/025375, filed Dec. 30, 2013, 5 pp.

Second Written Opinion from International Application No. PCT/US2013/025375, dated Mar. 31, 2014, 5 pp.

Response to Second Written Opinion dated Mar. 31, 2014, from International Application No. PCT/US2013/025375, filed May 30, 2014, 18 pp.

International Preliminary Report on Patentability from International Application No. PCT/US2013/025375, dated Jul. 9, 2014, 8 pp.

Vlček, A. et al, "Front-to-Back Blending with Early Fragment Discarding," Association for Computing Machinery, Inc., May 13-15, 2010, 8 pp.

Wexler, D. et al., "GPU-Accelerated High-Quality Hidden Surface Removal," The Eurographics Association Conference on Graphics Hardware, 2005, 8 pp.

* cited by examiner

TECHNIQUES FOR REDUCING MEMORY ACCESS BANDWIDTH IN A GRAPHICS PROCESSING SYSTEM BASED ON DESTINATION ALPHA VALUES

TECHNICAL FIELD

The disclosure relates to graphics processing systems, and more particularly, to processing pixels in a graphics processing system.

BACKGROUND

Computing devices often utilize a graphics processing unit (GPU) to accelerate the rendering of graphics data onto a display. Such computing devices may include, e.g., computer workstations, mobile phones, embedded systems, personal computers and video game consoles. GPUs are also used by windows-based operating systems to perform window composition operations. A windows-based operating system uses a graphical user interface (GUI) that includes a windowing system which allows a user to work with and switch between several different open application programs, each of which may run in its own application window. In such a system, the individual windows may be positioned and resized by a user into various overlapping and/or non-overlapping configurations.

A window manger is a type of software program that is used to control both the placement and appearance of the windows in a windows-based operating system. The window manager also interacts with the GPU to cause the windows to be drawn to the screen and to refresh the windows either periodically or in response to a change in position, size or appearance of any of the windows. Each application typically stores a representation of the current appearance of the application's window as a surface in the system memory. A surface may refer to a collection of color data for an array of pixels. In order to refresh the display, the window manager typically redraws all of the surfaces associated with all open application windows onto the screen. Because the entire set of surfaces to be displayed on a display at a given point in time may include surfaces that overlap with each other, the windows manager typically performs a surface composition operation, which converts the multiple independent surfaces into a single screen surface for presentation on a display. One technique for performing surface composition involves drawing the surfaces onto the screen in a back-to-front order, e.g., according to the painter's algorithm. In this way, if two surfaces contain overlapping portions, the overlapping portions of the front-most surface will be drawn on top of the overlapping portions of the back-most surface, thereby causing the overlapping portions of the first surface to be visible and the overlapping portions of the second surface to not be visible as a viewer would expect to see. Thus, a window manager may perform surface composition by drawing each application surface to the screen, whether visible or not, in a particular order.

To draw each application surface, the window manager may cause the GPU to render one or more primitives associated with the surface and to apply various combinations of textures to the primitives to give the desired appearance to the surfaces. The textures that are applied to each of the primitives may be defined by texture values that correspond to and/or are derived from the color values contained in the application surface associated with the primitive. In addition, the window manager may modify the texture values and/or apply additional textures to achieve particular visual effects, e.g., shadows, borders, transparency, dimming, etc. For each texture that is applied to a primitive, a GPU typically accesses the texture values for every pixel associated with the primitive from an off-chip memory, which may result in a high amount of memory bandwidth usage.

SUMMARY

This disclosure describes techniques for reducing memory access bandwidth in a graphics processing system based on destination alpha values. When processing an individual source pixel according to the techniques of this disclosure, a destination alpha testing module may retrieve a destination alpha value associated with the source pixel from a bin buffer, and determine whether or not to cause texture values for the source pixel to be retrieved from a texture buffer based on the destination alpha value. In some examples, the destination alpha value may indicate a level of opacity of a destination pixel that has the same screen location as the source pixel. By selectively retrieving texture values for source pixels based on their corresponding destination alpha values, the techniques of this disclosure may effectively reduce the number of source reads that need to occur with respect to a texture buffer when compared to the number of source reads that typically occur with respect to a texture buffer in a conventional graphics system. In this manner, the memory access bandwidth for a graphics processing system may be reduced.

In one example, this disclosure describes a method that includes retrieving, with a graphics processor, a destination alpha value from a bin buffer. The destination alpha value is generated in response to processing a first pixel associated with a first primitive. The method further includes determining, with the graphics processor and based on the destination alpha value, whether to perform an action that causes one or more texture values for a second pixel to not be retrieved from a texture buffer. The second pixel is associated with a second primitive different than the first primitive. The method further includes performing, with the graphics processor, the action that causes the one or more texture values for the second pixel to not be retrieved from the texture buffer in response to determining to perform the action.

In another example, this disclosure describes a graphics processing device that includes a destination alpha testing module configured to retrieve a destination alpha value from a bin buffer. The destination alpha value is generated in response to processing a first pixel associated with a first primitive. The destination alpha testing module is further configured to determine, based on the destination alpha value, whether to perform an action that causes one or more texture values for a second pixel to not be retrieved from a texture buffer, and to perform the action that causes the one or more texture values for the second pixel to not be retrieved from the texture buffer in response to determining to perform the action. The second pixel is associated with a second primitive different than the first primitive In another example, this disclosure describes an apparatus that includes means for retrieving a destination alpha value from a bin buffer. The destination alpha value is generated in response to processing a first pixel associated with a first primitive. The apparatus further includes means for determining, based on the destination alpha value, whether to perform an action that causes one or more texture values for a second pixel to not be retrieved from a texture buffer. The second pixel is associated with a second primitive different than the first primitive. The apparatus further includes means for performing the action that causes the one or more texture values for the second pixel to not be retrieved from the texture buffer in response to determining to perform the action.

In another example, this disclosure describes a computer-readable medium that includes instructions that cause one or more processors to retrieve a destination alpha value from a bin buffer. The destination alpha value is generated in response to processing a first pixel associated with a first primitive. The computer-readable medium further comprises instructions that cause the one or more processors to determine, based on the destination alpha value, whether to perform an action that causes one or more texture values for a second pixel to not be retrieved from a texture buffer. The second pixel is associated with a second primitive different than the first primitive. The computer-readable medium further comprises instructions that cause the one or more processors to perform the action that causes the one or more texture values for the second pixel to not be retrieved from the texture buffer in response to determining to perform the action.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
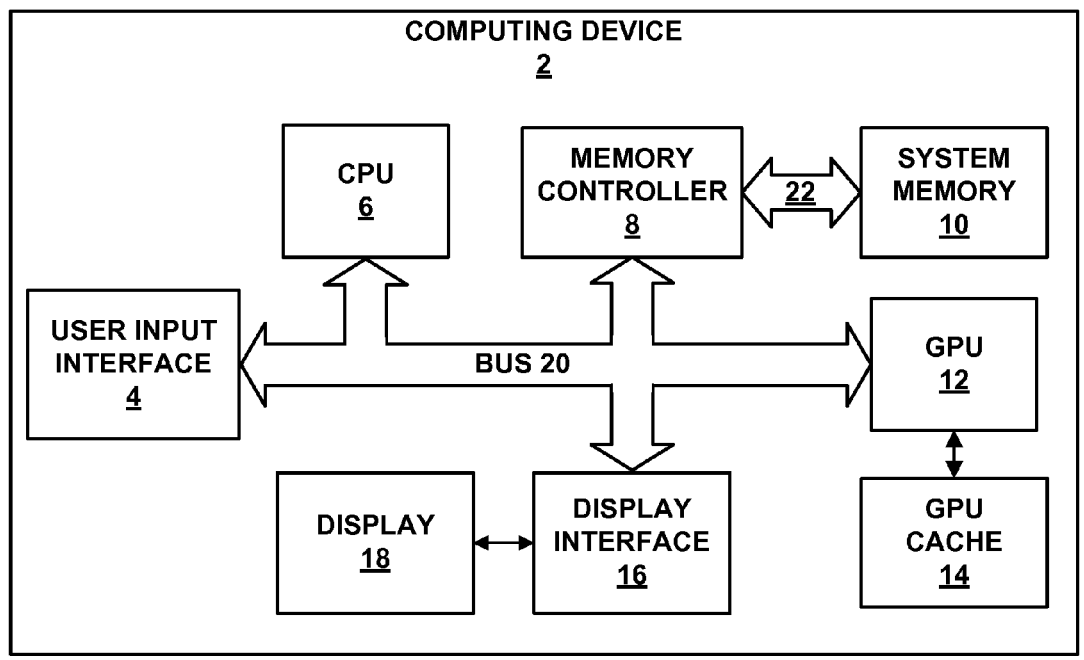
FIG. 1 is a block diagram illustrating an example computing device that may be used to implement the destination alpha value-based selective texture value retrieval techniques of this disclosure.

This disclosure describes techniques for reducing memory access bandwidth in a graphics processing system based on destination alpha values. When processing an individual source pixel according to the techniques of this disclosure, a destination alpha testing module may determine whether or not to cause texture values for the source pixel to be retrieved from a buffer based on a destination alpha value associated with the source pixel. In some examples, the destination alpha value may indicate a level of opacity of a destination pixel that has the same screen location as the source pixel. By selectively retrieving texture values for source pixels based on their corresponding destination alpha values, the techniques of this disclosure may effectively reduce the number of source reads that need to occur with respect to a texture buffer when compared to the number of source reads that typically occur with respect to a texture buffer in a conventional graphics system. In this manner, the memory access bandwidth for a graphics processing system may be reduced.

The techniques of this disclosure may be particularly useful in a graphics processing environment where windows composition is performed in a front-to-back manner, e.g., according to a reverse painter's algorithm. In such an environment, if a destination pixel is already opaque due to one or more previously processed surfaces, then any subsequent source pixels that are processed for that same pixel location will not contribute to the overall appearance of the destination pixel because, due to the front-to-back rendering, such source pixels are situated behind the previously processed pixels for that location, and are therefore not visible. As such, any subsequent source pixels for that pixel location may be safely discarded without affecting the appearance of the rendered image. Therefore, by utilizing the techniques of this disclosure in a front-to-back compositing environment, the techniques of this disclosure may be used, in some examples, to reduce memory access bandwidth for a graphics processing system without sacrificing the quality of the resulting rendered image.

The destination alpha value-based selective texture value retrieval techniques of this disclosure may be particularly useful in the context of bin rendering, e.g., a rendering context where a graphics image is subdivided into a plurality of smaller portions (e.g., subsets of destination pixels, tiles of pixels, or bins), and each portion of the image is rendered as a separate rendering pass. In such a rendering context, the destination alpha values for a particular bin may be accessible via a bin buffer when such values are needed by the destination alpha testing module. This alleviates the need to access the destination alpha values from a frame buffer, which may be located in a memory with a lower available bandwidth than the bin buffer. Therefore, by implementing the techniques of this disclosure in a binning context where the destination alpha values are retrieved from a bin buffer, the overhead bandwidth that may be needed to retrieve the destination alpha values may be relatively minimal compared to the bandwidth savings achieved by reducing the number of source reads to the texture buffer.

Although z-buffering techniques may be used to reduce compositing bandwidth by discarding source pixels that are behind other source pixels in the same pixel location, such techniques do not properly render surfaces when the pixels have per-pixel source alpha values, which essentially allow overlapping pixels to be translucent. The destination alpha value-based selective texture value retrieval techniques of this disclosure, however, may reduce compositing bandwidth even when all surfaces have per-pixel source alpha values, thereby providing a more robust bandwidth reduction mechanism.

The destination alpha testing module that is used to implement the selective texture value retrieval techniques of this disclosure may be implemented in various ways. For example, the destination alpha testing module may be implemented as a dedicated fixed-function hardware block, as a shader program executing on a shader unit, as a configurable stencil testing block configured to perform destination alpha testing, and/or as a configurable z/stencil testing block configured to perform destination alpha testing. These various configurations will be described in further detail later in this disclosure.

FIG. 1 is a block diagram illustrating an example computing device 2 that may be used to implement the destination alpha value-based selective texture value retrieval techniques of this disclosure. Computing device 2 may comprise, for example, a personal computer, a desktop computer, a laptop computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GPU cache 14, a display interface 16, a display 18 and buses 20, 22. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

According to this disclosure, GPU 12 may be configured to selectively retrieve texture values for a source pixel based on a destination alpha value associated with the source pixel. For example, GPU 12 may generate a destination alpha value in response to processing a first pixel associated with a first rasterized primitive, store the destination alpha value in a bin buffer, retrieve the destination alpha value from the bin buffer in response to processing a second pixel different than the first pixel, determine, based on the destination alpha value, whether to perform an action that causes one or more texture values for a second pixel to not be retrieved from a buffer, and perform the action that causes the one or more texture values for the second pixel to not be retrieved from the buffer in response to determining to perform the action. The second pixel may be associated with a second rasterized primitive that is different than the first rasterized primitive. In addition, the second pixel may have the same pixel location as the first pixel (e.g., the first and second pixels may have the same positional coordinates in screen space). By selectively retrieving texture values for source pixels based on their corresponding destination alpha values, GPU 12 may effectively reduce the number of source reads that need to occur with respect to texture values, thereby reducing the memory access bandwidth needed by GPU 12 to render a graphics image.

In some examples, GPU 12 may determine whether one or more texture values for the second pixel should be retrieved from a texture buffer at least in part by comparing the destination alpha value to a threshold value, and determining whether to perform the action based on a result produced by comparing the destination alpha value to the threshold value. In some implementations, GPU 12 may compare the destination alpha value to the threshold value at least in part by determining whether the destination alpha value is less than or equal to the threshold value. In such examples, GPU 12 may perform the action that causes the one or more texture values for the second pixel to not be retrieved from the texture buffer in response to determining that the destination alpha value is less than or equal to the threshold value, and perform an action that causes the one or more texture values for the second pixel to be retrieved from the texture buffer in response to determining that the destination alpha value is not less than or equal to the threshold value. The threshold value may be, for example, a value that is indicative of a threshold level of opacity for a destination pixel at or below which pixels that are situated behind the destination pixel will not be visible and/or do not need to be displayed. In some examples, the threshold value may be indicative of a level of opacity where the destination pixel is completely opaque, e.g., a value of zero. The threshold value may be configurable by software executing on CPU 6 and/or by hardware or shader components on GPU 12.

In some implementations, the destination alpha value, $\alpha_D$, may be within a range of zero to one, inclusive (i.e., $0 \le \alpha_D \le 1$), where a value of zero is indicative of a completely opaque pixel (i.e., a pixel with substantially no transparency—100% opaque, 0% transparent), and a value of one is indicative of a completely transparent destination pixel (i.e., a pixel with substantially no opacity—100% transparent, 0% opaque). As the destination alpha value increases from zero to one, in such examples, the level of opacity decreases from substantially complete opacity at a destination alpha value of zero to substantially no opacity at a destination alpha value of one. In additional implementations, a destination alpha value of zero may be indicative of a completely transparent pixel and a destination alpha value of one may be indicative of a completely opaque pixel. Other examples and ranges of destination alpha values are possible and within the scope of this disclosure.

The destination alpha value may, in some examples, correspond to the destination alpha value generated by a conventional alpha blending unit in a graphics pipeline. In further examples, the destination alpha value may correspond to the destination alpha value generated by an alpha blending unit that blends according to a front-to-back alpha blending function. In additional examples, the destination alpha value may correspond to a destination alpha value stored in a frame buffer and/or a bin buffer, as described in further detail in this disclosure. The destination alpha value may, in further examples, be a combination of any of the above examples.

In additional examples, the pixel processing pipeline of the GPU may perform processing at a pixel sample level. In such examples, each pixel may be associated with a plurality of pixel samples, and each pixel sample may be associated with a single pixel. In addition, each pixel sample may have a respective destination alpha value. In order to determine whether one or more texture values for the second pixel should be retrieved from a buffer in such examples, GPU 12 may determine whether the destination alpha values for all of the samples associated with a pixel are less than or equal to the threshold value. If the destination alpha values for all of the samples associated with the pixel are less than or equal to the threshold value, then GPU 12 may cause texture values to not be retrieved for the pixel. Otherwise, if the destination alpha values for at least one of the samples associated with the pixel is not less than or equal to the threshold value, then GPU 12 may cause texture values to be retrieved for the pixel.

In some examples, the action that causes the one or more texture values for the second pixel to not be retrieved from the buffer may be an action that discards the second pixel from a pixel processing pipeline prior to the second pixel arriving at a texture mapping stage of the pixel processing pipeline. In such examples, GPU 12 may be configured to determine whether to discard the second pixel from the pixel processing pipeline based on the destination alpha value, and to discard the second pixel from the pixel processing pipeline prior to the second pixel arriving at a texture mapping stage of the pixel processing pipeline in response to determining to discard the second pixel based on the destination alpha value. GPU 12 may also, in such examples, be configured to pass the second pixel onto a set of one or more processing stages that includes a texture mapping stage in response to determining not to discard the second pixel based on the destination alpha value.

In further examples, the action that causes the one or more texture values for the second pixel to not be retrieved from the buffer may be an action that causes texture mapping to not be performed for the second pixel. For example, the action may be an action that asserts a control signal that causes the texture values to not be retrieved for the second pixel. The control signal may be, for example, a control signal that causes another processing stage within the pixel processing pipeline to discard the pixel. As another example, the control signal may enable or disable a texture mapping stage for a particular pixel within the pixel processing pipeline. In more examples, the action that causes the one or more texture values for the second pixel to not be retrieved from the buffer may be an action that sets a texture mapping disable attribute for the second pixel to a value that causes texture mapping to be disabled for the pixel.

The destination alpha testing module that is used to implement the selective texture value retrieval techniques of this disclosure may be implemented in various ways. For example, the destination alpha testing module may be implemented as a dedicated fixed-function hardware block, as a shader program executing on a shader unit, as a configurable stencil testing block configured to perform destination alpha testing, and/or as a configurable z/stencil testing block configured to perform destination alpha testing. These various configurations will be described in further detail later in this disclosure.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

Figure 2:
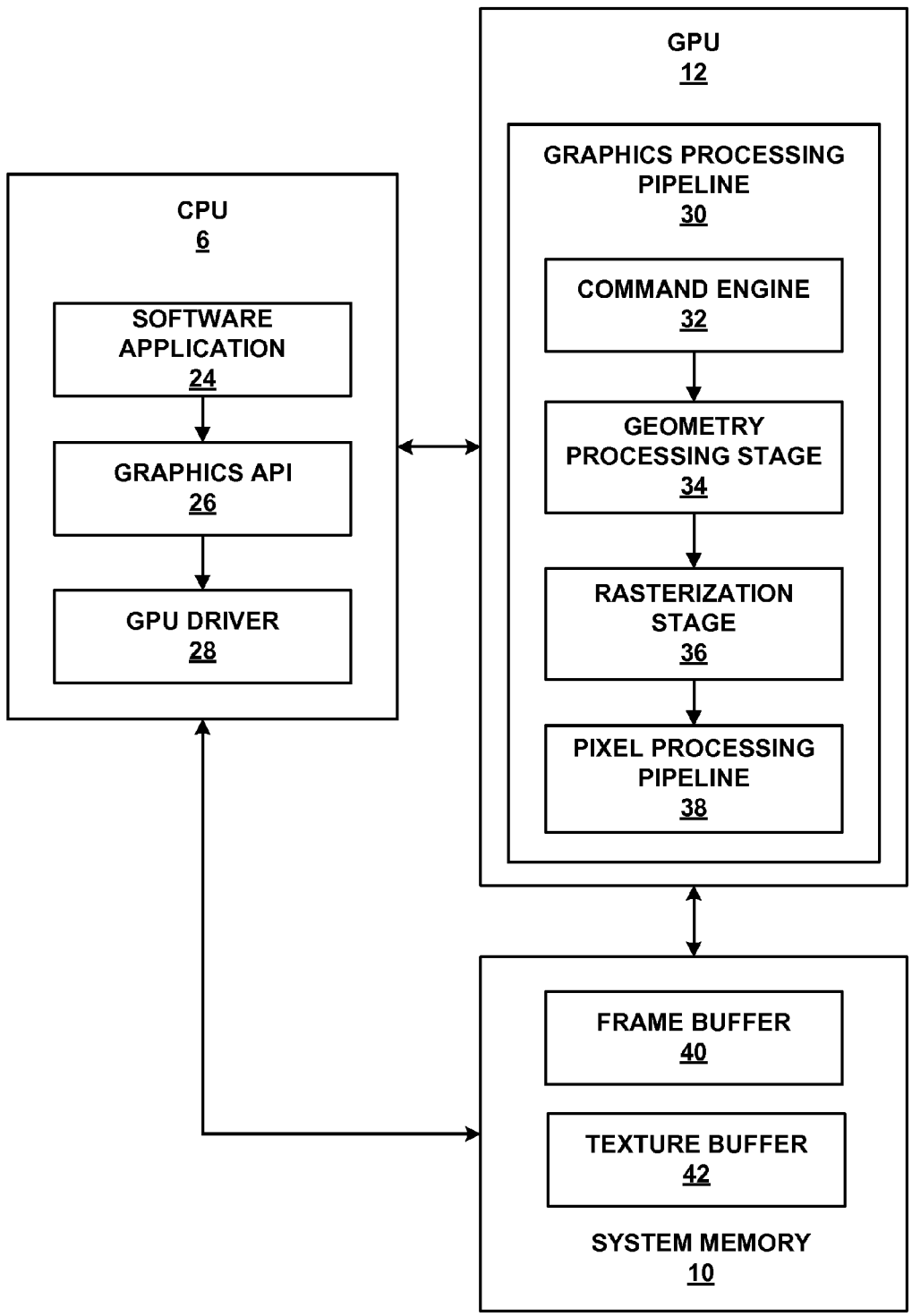
FIG. 2 is a block diagram illustrating the CPU, the GPU, and the system memory of the computing device in FIG. 1 in further detail.

FIG. 2 is a block diagram illustrating CPU 6, GPU 12, and system memory 10 of FIG. 1 in further detail. CPU 6 includes at least one software application 24, a graphics API 26, and a GPU driver 28, each of which may be one or more software applications or services that execute on CPU 6. GPU 12 includes a graphics processing pipeline 30 that includes a plurality of graphics processing stages that operate together to execute graphics processing commands. As shown in FIG. 2, graphics processing pipeline 30 includes a command engine 32, a geometry processing stage 34, a rasterization stage 36, and a pixel processing pipeline 38. Each of the components in graphics processing pipeline 30 may be implemented as fixed-function components, programmable components (i.e., as part of a shader program executing on a programmable shader unit), or as a combination of fixed-function and programmable components. System memory 10 includes a frame buffer 40 that may store rendered image data, and a texture buffer 42 that may store a plurality of texture values.

According to an example embodiment of this disclosure, software application 24 may be a window manager application that controls the position and appearance of one or more application windows in a GUI. In other examples, however, software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 28, via graphics API 26, to issue one or more commands to GPU 12 for rendering one or more graphics primitives into displayable graphics images. For example, software application 24 may invoke GPU driver 28, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 28, GPU driver 28 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 40 associated with a display device.

In examples where software application 24 includes a window manager, software application 24 may be configured to cause GPU 12 to render one or more surfaces associated with open GUI windows for individual user applications. Each of the application surfaces may correspond to an open window executing for a user application, and include a current state of color data for the window, which may be referred to herein as surface color data. In order for the window manager to render an application surface, software application 24 may issue one or more instructions to GPU driver 28 and/or memory controller 8 that cause all or part of the surface color data to be placed into one or more texture buffers for GPU 12, e.g., texture buffer 42. In addition, software application 24 may modify the color data and/or apply additional textures to achieve particular visual effects for particular windows, e.g., shadows, borders, transparency, dimming, etc. After setting up the texture buffers, software application 24 may issue one or more instructions that cause GPU 12 to render one or more primitives that correspond to the surface, and to apply one or more textures to some or all of the primitives. The surface color data may be stored in system memory 10 or in a cache for CPU 6. The texture buffers may, in some examples, be located in system memory 10. Thus, in some examples, both the surface color data and the one or more texture buffers may be part of the same memory subsystem although, in other examples, the surface color data and the one or more texture buffers may be situated on different memory subsystems.

According to example embodiments of this disclosure, software application 24 may issue one or more commands that cause an alpha blending block within GPU 12 to perform alpha blending using a set of one or more front-to-back alpha blending functions. A front-to-back alpha blending function may refer to an alpha blending function that is configured to blend pixels that are processed in a front-to-back manner (i.e., pixels closer to the viewer are processed prior to pixels farther from the viewer), and is distinct from back-to-front alpha blending functions that are commonly used in GPUs. An example set of front-to-back alpha blending functions may include the following functions:

$$Cdst[n]=(Adst[n-1])\times(Asrc[n]\times Csrc[n])+Cdst[n-1] \quad (1)$$

$$Adst[n]=(1-Asrc[n])\times(Adst[n-1]) \quad (2)$$

where p[0], p[1] ... p[n−1] are n previously processed source pixels, p[n] is the currently processed source pixel (i.e., the current source pixel), Cdst[n] is a destination color value generated in response to processing the current source pixel, Adst[n] is a destination alpha value generated in response to processing the current source pixel, Cdst[n−1] is a destination color value generated in response to processing the previously processed source pixel (i.e., p[n−1]), Adst[n−1] is a destination alpha value generated in response to processing the previously processed source pixel (i.e., p[n−1]), Csrc[n] is a source color value that corresponds to the current source pixel, and Asrc[n] is a source alpha value that corresponds to the current source pixel. In equations (1) and (2), for any value i, Adst[i]=0 may be indicative of a completely opaque destination pixel and Adst[i]=1 may be indicative of a completely transparent destination pixel. Adst[−1] and Cdst[−1] may be initialized to appropriate default values (e.g., values of 1 and 0, respectively). In some examples, the Asrc[n]×Csrc[n] multiply may be performed in a shader (e.g., a pixel shader), while the other math operations are performed as part of the alpha blending module.

GPU driver 28 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some example embodiments of this disclosure, a pixel shader program may also include instructions that selectively cause texture values to be retrieved for source pixels based on corresponding destination alpha values for the source pixels.

Graphics processing pipeline 30 may be configured to receive one or more graphics processing commands from CPU 6, via graphics driver 28, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

Each source pixel generated by rasterization stage 36 may correspond to a screen pixel location, i.e., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. According to this disclosure, the per-pixel operations performed by pixel processing pipeline 38 may include a destination alpha test, a texture mapping operation, and a destination alpha value generation operation. The destination alpha value generation operation may, in some examples, correspond to an alpha blending operation. In some examples, when processing an individual source pixel, pixel processing pipeline 38 may perform the destination alpha test prior to the texture mapping operation. Other per-pixel operations that may be performed by pixel processing pipeline 38 include, e.g., color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 40. The destination pixel data may be associated with a destination pixel in frame buffer 40 that has the same display location as the source pixel that was processed. The destination pixel data may include data such as, e.g., color values, destination alpha values, depth values, etc.

According to this disclosure, pixel processing pipeline 38 may generate a destination alpha value in response to processing a first pixel associated with a first rasterized primitive, store the destination alpha value in a bin buffer, retrieve the destination alpha value from the bin buffer in response to processing a second pixel different than the first pixel, determine, based on the destination alpha value, whether to perform an action that causes one or more texture values for a second pixel to not be retrieved from a buffer, and perform the action that causes the one or more texture values for the second pixel to not be retrieved from the buffer in response to determining to perform the action. The second pixel may be associated with a second rasterized primitive that is different than the first rasterized primitive. In addition, the second pixel may have the same screen pixel location as the first pixel (e.g., the first and second pixels may have the same positional coordinates in screen space). The destination alpha value may be associated with a destination pixel having the same screen pixel location as the first and second source pixels. For example, the destination alpha value for a source pixel may be a value that is indicative of an opacity of the destination pixel that has the same screen location as the source pixel. The opacity of the destination pixel may be determined at least in part by one or more previously processed source pixels associated with the pixel location. By selectively retrieving texture values for source pixels based on their corresponding destination alpha values, pixel processing pipeline 38 may effectively reduce the number of source reads that need to occur with respect to texture values, thereby reducing the memory access bandwidth needed for the graphics processing system.

In some examples, for each source pixel, pixel processing pipeline 38 may perform a destination alpha test, and either retrieve or not retrieve texture values for the source pixel based on results of the test. The destination alpha test may involve, for example, comparing a destination alpha value corresponding to the source pixel to a threshold. The threshold, in such examples, may be configurable by one or more of software application 24, GPU driver 28 and one or more components within GPU 12. The threshold value may be, for example, a value that is indicative of a threshold level of opacity for a destination pixel at or below which pixels that are situated behind the destination pixel will not be visible and/or do not need to be displayed.

In some examples, pixel processing pipeline 38 may implement the destination alpha value-based selective texture value retrieval techniques of this disclosure by selectively discarding source pixels in pixel processing pipeline 38 prior to the texture mapping stage of the pipeline based on the results of a destination alpha test. In further examples, pixel processing pipeline 38 may implement the techniques of this disclosure by selectively enabling and disabling texture mapping for the source pixel based on results of the destination alpha test. For example, pixel processing pipeline 38 may selectively assert a control signal that disables texture mapping based on the results of the destination alpha test or selectively set a pixel attribute that disables texture mapping based on the results of the destination alpha test.

Frame buffer 40 stores destination pixels for GPU 12. Each destination pixel may be associated with a unique screen pixel location. In some examples, frame buffer 40 may store color components and a destination alpha value for each destination pixel. For example, frame buffer 40 may store Red, Green, Blue, Alpha (RGBA) components for each pixel where the "RGB" components correspond to color values and the "A" component corresponds to a destination alpha value. In some examples, a subset (e.g., less than all) of the destination pixels that are stored in frame buffer 40 may be stored in a memory that has a higher available bandwidth than system memory 10 with respect to GPU 12, e.g., an on-chip bin buffer.

Texture buffer 42 stores one or more texture values for retrieval by GPU 12. The texture values may, in some examples, correspond to the color values defined in an application surface. GPU 12 may access system memory 10 to retrieve texture values from texture buffer 42. In some examples, a subset of the contents in texture buffer 42 may be cached in a texture cache accessible by GPU 12, e.g., GPU cache 14.

Although system memory 10 is illustrated as containing both frame buffer 40 and texture buffer 42 in the example graphics processing system of FIG. 2, in other examples, one or both of frame buffer 40 and texture buffer 42 may be implemented in other memory subsystems that are on the same or different chips as one or both of CPU 6 and GPU 12. In addition, frame buffer 40 and texture buffer 42 need not be implemented as part of the same memory subsystem.

In some examples, graphics processing pipeline 30 may process data at a pixel sample granularity rather than a pixel granularity. In such examples, rasterization block 36 may generate a plurality of source pixel samples for each source pixel, and pixel processing pipeline 38 may perform per-sample operations on the source pixel samples to produce a plurality of destination pixel samples, which are stored in frame buffer 40. The source pixel samples and the destination pixel samples may include substantially similar data to that which was discussed above with respect to the source and destination pixels, respectively, except that such data applies to the pixel sample rather than to the whole pixel. Display interface 16 may convert the destination pixel sample data into pixel data that can be displayed on a display. In some examples, four samples may be generated for each pixel and each sample may be associated with a single pixel. In other examples, however, any number samples may be generated for each pixel.

In additional examples, graphics processing pipeline 30 may render a graphics image according to a bin rendering technique, which may be alternatively referred to herein as a tile rendering technique. When rendering according to a bin rendering technique, graphics processing pipeline 30 may receive a batch of primitives (i.e., a plurality of primitives) to render into a resulting graphics image. To render the batch of primitives, the resulting graphics image may be subdivided into a plurality of smaller portions (e.g., tiles of pixels or bins), and graphics processing pipeline 30 may render each portion of the graphics image as a separate rendering pass. As part of a single rendering pass for a particular portion of the graphics image, graphics processing pipeline 30 may render all or a subset of the batch of primitives with respect to a particular subset of the destination pixels (e.g., a particular tile of destination pixels) of a graphics image. The particular subset of the destination pixels for a particular rendering pass may be referred to herein as the destination pixel range for the rendering pass. After performing a first rendering pass with respect to a first destination pixel range, graphics processing pipeline 30 may perform a second rendering pass with respect to a second destination pixel range different than the first destination pixel range. Graphics processing pipeline 40 may incrementally traverse through the tiles or bins until the primitives associated with every tile or bin have been rendered.

While performing a particular rendering pass, the pixel data for the subset of the destination pixels associated with that particular rendering pass may be stored in a bin buffer. After performing the rendering pass, graphics processing pipeline 30 may transfer the contents of the bin buffer to frame buffer 40. In some cases, graphics processing pipeline 30 may overwrite a portion of the data in frame buffer 40 with the data stored in the bin buffer. In other cases, graphics processing pipeline 30 may composite or combine the data in frame buffer 40 with the data stored in the bin buffer. After transferring the contents of the bin buffer to frame buffer 40, graphics processing pipeline 30 may initialize the bin buffer to default values and begin a subsequent rendering pass with respect to a different destination pixel range.

In some implementations, a binning pass may be performed prior to the separate rendering passes in order to sort the different primitives received in a batch of primitives into appropriate bins. For example, graphics processing pipeline 30 may determine which tiles (i.e., bins) each primitive contributes to or overlaps, and assign the primitive to one or more tile-specific bins based on the determination. Then, when a rendering pass is performed for a particular bin, graphics processing pipeline 30 may render each of the primitives that are assigned to the bin with respect to the particular destination pixel range associated with the bin. Although graphics processing pipeline 30 is described herein as performing the binning pass, in other examples, the binning pass may be performed by another component in GPU 12, by a software module in CPU 6 (e.g., GPU driver 28), or any combination thereof.

In additional implementations, a binning pass may not necessarily be performed. Instead, GPU driver 28 and/or graphics processing pipeline 30 may perform each of the rendering passes with respect to all of the primitives in the received batch of primitives. For each rendering pass, GPU driver 28 and/or graphics processing pipeline 30 may use different scissors settings and/or different memory address offsets such that the destination pixels associated with a given rendering pass are updated during that rendering pass.

In some examples, graphics processing pipeline 30 may access the bin buffer via a first communication interface, access texture buffer 42 via a second communication interface, and access frame buffer 40 via a third communication interface. In such examples, the first communication interface may have, in some examples, a higher bandwidth than the second communication interface and/or the third communication interface. In some cases, the second communication interface may be the same communication interface as the third communication interface, e.g., when frame buffer 40 and texture buffer 42 are both implemented in system memory 10. The second communication interface and the third communication interface, in some examples, may correspond to busses 20 and/or 22 in FIG. 1. When the bin buffer is an on-chip bin buffer, the first communication interface may be a communication interface that is internal to GPU 12.

As used herein, bandwidth may refer to the rate at which a communication interface is capable of transferring data between two components, e.g., a memory component and GPU 12. The units for bandwidth may, in some examples, be given as a number of bits per unit of time, e.g., gigabits per second (Gb/s). When a bus having a bus width of multiple bits is used as part of the communication interface, the bandwidth may, in some examples, be equal to the product of the width of the bus multiplied by the rate at which data is transferred along a single bit line. For example, if a bus is 16 bits wide, and each bit line of the bus is capable of transferring data at a rate of 2 Gb/s, the bandwidth of the bus may be equal to 32 Gb/s. If multiple buses form a communication interface between two components, then the bandwidth of the communication interface may be a function of the bandwidth of each of multiple buses, e.g., the minimum bandwidth of each of the individual buses.

To achieve a higher bandwidth for the communication interface used to access the bin buffer, the bin buffer may, in some examples, be implemented on the same microchip as GPU 12. Such a bin buffer may be referred to as an on-chip bin buffer. When the bin buffer is implemented on the same chip as GPU 12, GPU 12 does not necessarily need to access the bin buffer via the system and memory buses (e.g., busses 20, 22 in FIG. 1), but rather may access the bin buffer via an internal communication interface (e.g., a bus) implemented on the same chip as the GPU 12. Because such an interface is on-chip, it may be capable of operating at a higher bandwidth than the system and memory busses. Although the above described technique is one way of achieving a communication interface for bin buffer that exceeds the bandwidth of the communication interface used to access frame buffer 40 and/or texture buffer 42, other techniques are possible and within the scope of this disclosure.

The capacity of bin buffer may, in some examples, be limited by the area available on certain types of computing devices, e.g., mobile devices. Moreover, when the bin buffer is implemented on the same chip as GPU 12, the amount of area available to implement the bin buffer on the same chip may be limited due to the other functionality that is implemented on the chip. In some examples, the bin buffer may have a bit density that is lower than the bit density of one or more of frame buffer 40 and/or texture buffer 42 further limiting the capacity of the bin buffer. Because of these and/or other factors, the capacity of the bin buffer may, in some cases, be less than the size of one or both of frame buffer 40 and texture buffer 42. Consequently, the capacity of the bin buffer may, in such examples, be less than a minimum capacity needed to store pixel data for all of a plurality of destination pixels associated with a graphics image. The capacity of a memory component may refer a maximum amount of data (e.g., a maximum number of bits) capable of being stored in the memory component. The size of frame buffer 40 and texture buffer 42 may refer to the amount of data (e.g., the number of bits) stored in the memory range allocated to frame buffer 40 and texture buffer 42, respectively. Bit density may refer to the number of bits that can be stored in a particular amount of area.

As discussed above, when rendering according to a bin rendering technique, graphics processing pipeline 30 may render each portion of the graphics image as a separate rendering pass. For example, as part of a single rendering pass for a particular portion of the graphics image, graphics processing pipeline 30 may render all or a subset of the batch of primitives with respect to a particular destination pixel range (e.g., a particular subset of the destination pixels of the graphics image). The capacity of bin buffer may be configured to be greater than or equal to the size of the destination pixel range. Therefore, during a single rendering pass, all destination pixel data (e.g., destination alpha values and destination color values) associated with the destination pixel range for the rendering pass may be available in the bin buffer without necessarily needing to access frame buffer 40. Consequently, during a single rendering pass, graphics processing pipeline 30 may be able to read the destination alpha values from the bin buffer via a relatively high bandwidth communication interface rather than having to read such data from frame buffer 40 via a relatively low bandwidth communication interface.

Although some graphics systems that do not perform bin rendering may be capable of caching part of the frame buffer by using a hardware-based on-chip cache, such caches do not guarantee that the destination alpha values for a given pixel will be available when needed. This is because multiple destination pixels may map to the same address in the hardware-based cache. If bin rendering is not used in this case, then the current state of the hardware-based cache may not necessarily include the destination pixel values associated with a currently processed primitive, but rather include destination pixel values associated with previously processed primitives in other areas of the graphics image.

In contrast to a hardware-based cache where multiple destination pixels map to the same cache location, the destination pixels stored in the bin buffer for a given rendering pass may, in some examples, be uniquely addressable. In other words, for a given rendering pass, a one-to-one mapping may be defined between the addressable storage slots in the bin buffer and the destination pixels used for that rendering pass. Consequently, when rendering according to bin rendering technique, all destination alpha values for a given binning pass may, in some examples, be available from the bin buffer via a relatively low bandwidth communication interface. Moreover, unlike the hardware-based cache systems, because of the uniquely addressable data in the bin buffer, cache misses do not occur, thereby alleviating the need to resort to bandwidth-expensive frame buffer accesses in the event of a cache miss.

The destination alpha value-based selective texture value retrieval techniques of this disclosure may be particularly useful in the context of bin rendering because the destination alpha values for a particular bin may already be loaded into the bin buffer when needed by the destination alpha testing module. This may alleviate the need to access such values from frame buffer 40, which may be located in a memory with lower available bandwidth, e.g., system memory 10. Therefore, in a binning context, the overhead bandwidth that may be needed to retrieve the destination alpha values may be relatively minimal compared to the bandwidth savings achieved by reducing the number of source reads to the texture buffer according to the techniques of this disclosure.

In further examples, GPU driver 28 may selectively enable and disable the destination alpha value-based selective texture value retrieval techniques of this disclosure, which are implemented by pixel processing pipeline 38. In some examples, software application 24 may issue a command to GPU driver 28 that instructs GPU driver 28 to enable a destination alpha value-based selective texture value retrieval mode for GPU 12 in accordance with the techniques of this disclosure. In additional examples, GPU driver 28 may detect situations where using the destination alpha value-based selective texture value retrieval techniques of this disclosure would not interfere with the quality of the resulting image, e.g., GPU driver 28 may detect when a front-to-back rendering scheme has been implemented by software application 24. In response to such a detection, GPU driver 28 may enable a destination alpha value-based selective texture value retrieval mode for GPU 12 in accordance with the techniques of this disclosure.

As used herein, a source pixel may refer to pixel data that has been generated by rasterization block 36 and has not yet been stored to either frame buffer 40 or a corresponding bin buffer. Pixel data that has been written to frame buffer 40 or a corresponding bin buffer may be referred to as a destination pixel. A destination pixel may include composited pixel data from multiple source pixels associated with different primitives. Thus, pixel processing pipeline 38 operates on source pixels and updates the destination pixel data in frame buffer 40 or a corresponding bin buffer in response to processing the source pixels. It should be noted that not all source pixels necessarily graduate to become destination pixels. For example, any subsequently processed source pixels that are occluded by previously processed pixels may not necessarily become a destination pixel. Rather, a z-test and/or a destination alpha test may discard such occluded pixels. In some cases, the term "fragment" may be used by those skilled in the art to refer to a "source pixel," and the term "pixel" may be used by those skilled in the art to refer to a "destination pixel." Whether any of the pixels described in this disclosure are source pixels or destination pixels will either be explicitly identified or should be able to be determined from the context in which the pixel is described.

The destination alpha value for a particular pixel location may be incrementally updated each time a source pixel corresponding to a particular screen location has completed processing. The updated destination alpha value may be a function of the previous destination alpha value for the same pixel location. Thus, the destination alpha value may represent a "composite" alpha value that is indicative of an opacity of a destination pixel at a given point in time based on all source pixels corresponding to the destination pixel that have completed processing up to the given point in time.

Figure 3:
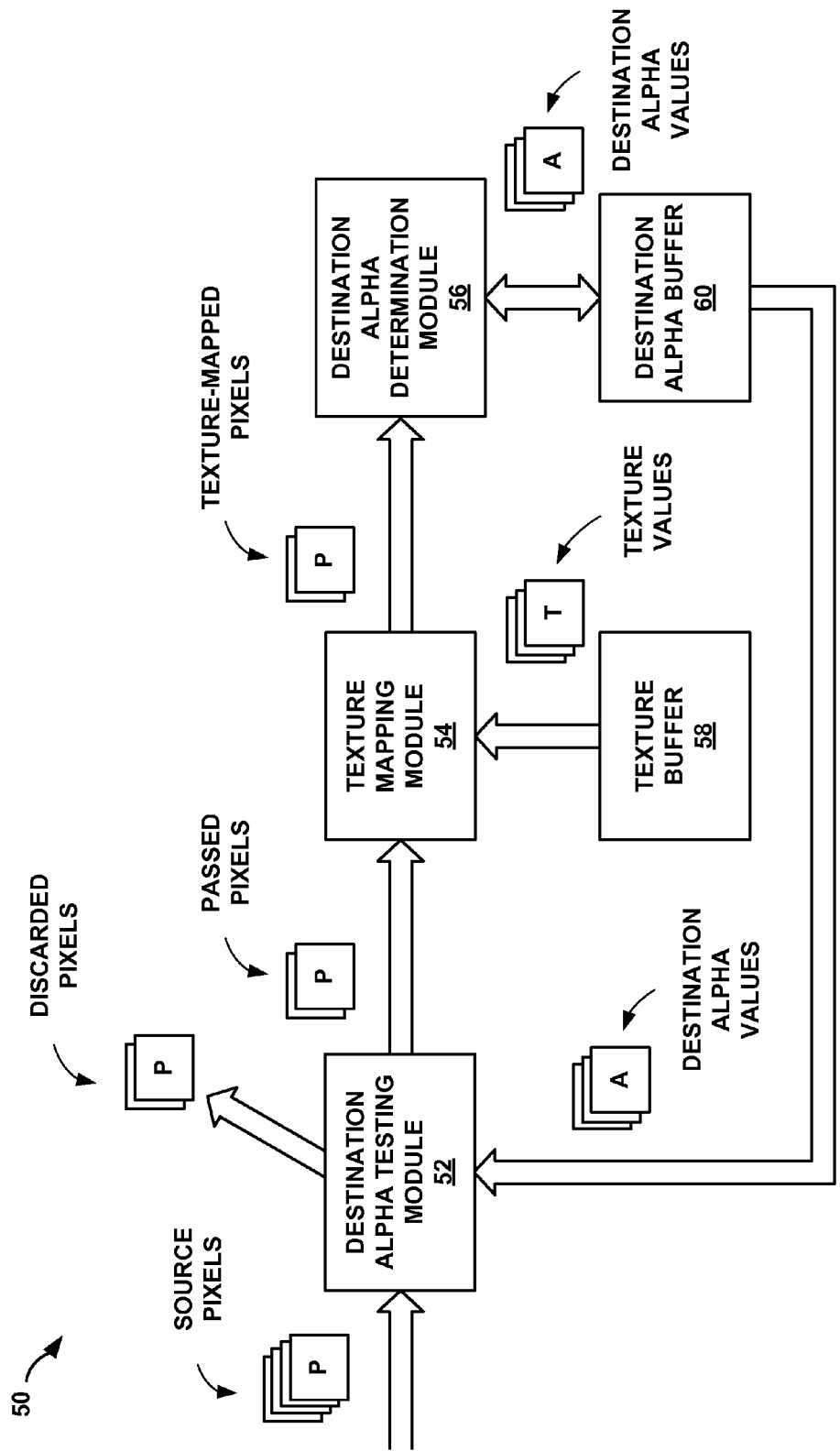
FIG. 3 is a block diagram illustrating an example pixel processing pipeline that may be used to implement the destination alpha value-based selective texture value retrieval techniques of this disclosure.

FIG. 3 is a block diagram illustrating an example pixel processing pipeline 50 that may be used to implement the destination alpha value-based selective texture value retrieval techniques of this disclosure. Pixel processing pipeline 50 may be configured to selectively discard source pixels prior to a texture mapping stage based on destination alpha values corresponding to the source pixels. Pixel processing pipeline 50 includes a destination alpha testing module 52, a texture mapping module 54, a destination alpha determination module 56, a texture buffer 58 and a destination alpha buffer 60. Destination alpha testing module 52, texture mapping module 54, and destination alpha determination module 56 may be implemented on one or more processors as one or more fixed function processing stages, one or more programmable stages or any combination thereof. Texture buffer 58 and destination alpha buffer 60 may each be implemented as one or more memory storage units.

Destination alpha testing module 52 is configured to receive a source pixel from a prior processing stage, to perform a destination alpha test on the received pixel, and to selectively discard the source pixel based on results of the destination alpha test. For example, destination alpha testing module 52 may determine whether to discard a source pixel or to pass the source pixel on to a set of one or more subsequent processing stages for further processing based on the destination alpha value corresponding to the source pixel. In this manner, destination alpha testing module 52 may effectively determine whether a destination pixel that corresponds to the received source pixel is already opaque due to one or more previously processed source pixels that correspond to the destination pixel.

In some examples, the prior processing stage may be rasterization block 36. In further examples, the prior processing stage may be a prior pixel processing pipeline stage, e.g., a pixel ownership test block, a scissors test block, a source alpha test block, a pixel shader stage, or any other pixel processing stage found in a graphics processor. The set of one or more subsequent processing stages may include texture mapping module 54. In some examples, destination alpha testing module 52 may pass the source pixel onto texture mapping module 54 by passing the source pixel onto one or more intervening processing stages between destination alpha testing module 52 and texture mapping module 54. In additional examples, destination alpha testing module 52 may pass the source pixel directly to texture mapping module 54. The pixels that are passed onto the set of one or more subsequent processing stages may be referred to herein as passed pixels.

According to this disclosure, destination alpha testing module 52 may be configured to determine whether to perform an action that causes one or more texture values for a source pixel to not be retrieved from texture buffer 58, and to perform the action that causes the one or more texture values for the source pixel to not be retrieved from texture buffer 58 in response to determining to perform the action. For example, when receiving a source pixel, destination alpha testing module 52 may retrieve a destination alpha value from destination alpha buffer 60 that corresponds to the source pixel, e.g., destination alpha testing module 52 may determine a screen pixel location for the source pixel using the positional coordinates included with the source pixel, and retrieve a destination alpha value associated with the same screen pixel location. Based on the retrieved destination alpha value, destination alpha testing module 52 may determine whether to perform an action that causes the one or more texture values for the source pixel to not be retrieved from texture buffer 58, and perform the action if so determined.

In the example pixel processing pipeline shown in FIG. 3, the action performed by destination alpha testing module 52 that causes the one or more texture values for the source pixel to not be retrieved from texture buffer 58 includes discarding the source pixel from pixel processing pipeline 50 prior to a texture mapping stage represented by texture mapping module 54. However, in other example embodiments, other actions may be performed by destination alpha testing module 52 to cause the one or more texture values for the source pixel to not be retrieved from texture buffer 58. For example, destination alpha testing module 52 may, in some examples, assert a control signal that causes another processing stage within pixel processing pipeline 50 to discard the pixel. In additional examples, destination alpha testing module 52 may assert a control signal that enables or disables texture mapping module 54 for a particular pixel within pixel processing pipeline 50. In further examples, destination alpha testing module 52 may set a texture mapping disable attribute for the source pixel to a value that causes texture mapping to be disabled for the source pixel, and pass the pixel onto one or more subsequent processing stages in pixel processing pipeline 50. In such examples, texture mapping module 54 may be configured to disable texture mapping for pixels that have a set texture mapping disable attribute.

In some examples, destination alpha testing module 52 may determine whether to perform the action that causes the one or more texture values for the source pixel to not be retrieved from texture buffer 58 by comparing the retrieved destination alpha value to a threshold value. Based on the results of the comparison, destination alpha testing module 52 may determine whether to perform the action that causes the one or more texture values for the source pixel to not be retrieved from texture buffer 58 For example, destination alpha testing module 52 may determine whether the destination alpha value is less than or equal to the threshold. In response to determining that the destination alpha value is less than or equal to the threshold, destination alpha testing module 52 may perform the action that causes the one or more texture values for the source pixel to not be retrieved from texture buffer 58, e.g., discard the source pixel prior to texture mapping stage 54. On the other hand, in response to determining that the destination alpha value is not less than or equal to the threshold, destination alpha testing module 52 may perform an action that causes the one or more texture values for the second pixel to be retrieved from texture buffer 58. The threshold value may be, for example, a value that is indicative of a threshold level of opacity for a destination pixel at or below which pixels that are situated behind the destination pixel will not be visible and/or do not need to be displayed.

The threshold value may be, in some examples, a fixed value that is hardwired into destination alpha module 52. In further examples, the threshold value may be configurable by other components within the graphics processor and/or programmable by a graphics driver or user application.

In some implementations, the destination alpha value, $\alpha_D$, may be within a range of zero to one, inclusive (i.e., $0 \leq \alpha_D \leq 1$), where a value of zero is indicative of a completely opaque destination pixel, a value of one is indicative of a completely transparent pixel, and values between zero and one represent various degrees of opacity for translucent pixels. As the destination alpha value increases from zero to one, in such examples, the level of opacity decreases from substantially complete opacity at a destination alpha value of zero to substantially no opacity at a destination alpha value of one.

In some examples, the threshold value may be indicative of a completely opaque destination pixel, e.g., a value of zero. By setting the threshold value to zero, the destination alpha test block may discard source pixels that correspond to destination pixels that are already completely opaque. When surfaces are drawn in a front-to-back manner, any source pixels that are subsequently processed for the destination pixel will not contribute to the overall appearance of the destination pixel because any such source pixels are located behind the source pixels that have already been processed for the destination pixel. Discarding these source pixels may free up memory access bandwidth in the graphics processing system due to not needing to retrieve texture values that do not contribute to the overall image.

Destination alpha testing module 52 may be implemented in various ways. For example, destination alpha testing module 52 may be implemented as a dedicated fixed-function hardware block, as a shader program executing on a shader unit, as a configurable stencil testing block configured to perform destination alpha testing, and/or as a configurable z/stencil testing block configured to perform destination alpha testing. These various configurations will be described in further detail later in this disclosure.

Texture mapping module 54 is configured to receive source pixels, e.g., passed source pixels, and to perform texture mapping operations on the source pixels to produce texture-mapped pixels. For each source pixel, texture mapping module 54 may retrieve one or more texture values from texture buffer 58 based on one or more texture coordinates included in the received source pixel. The texture coordinates may specify and/or determine which texture values to retrieve from texture buffer 58. After retrieving the texture coordinates, texture mapping module 54 may modify the color coordinates of the source pixel (e.g., RGB components) based on the one or more retrieved texture values according to a texture mapping function to generate a resulting texture-mapped pixel with modified color components. The texture mapping function may specify texture-mapped color values as a function of the texture values retrieved from texture buffer 58 and the positional coordinates of the source pixel. The texture mapping function may be a user-specified function. Various texture mapping functions are known in the art and will not be described in further detail in this disclosure. In some examples, texture mapping module 54 may be implemented as a shader program executing on a shader unit, a fixed function hardware processing stage, or any combination thereof.

Texture mapping module 54 may pass the texture-mapped pixels onto one or more subsequent processing stages for further processing. Although destination alpha determination module 56 is illustrated as the subsequent processing stage for texture mapping module 54 in FIG. 3, any number of intervening processing stages may be included between texture mapping module 54 and destination alpha determination module 56. Similarly, although destination alpha testing module 52 is illustrated as the prior processing stage for texture mapping module 54 in FIG. 3, any number of intervening processing stages may be included between destination alpha testing module 52 and texture mapping module 54.

Destination alpha determination module 56 is configured to receive a source pixel and to generate a destination alpha value for a destination pixel having the same screen pixel location (i.e., positional coordinates in screen space) as the source pixel. In some examples, destination alpha determination module 56 may retrieve a previous destination alpha value for the screen pixel location from destination alpha buffer 60, and generate a subsequent destination alpha value for the screen pixel location as a function of the previous destination alpha value and one or more color components and/or alpha components of the source pixel. For example, destination alpha determination module 56 may generate the subsequent destination alpha value for the screen pixel location as a function of the previous destination alpha value (i.e., the "A" component retrieved from destination alpha buffer 60) and a source alpha value (i.e., the "A" component) of the source pixel.

In some examples, destination alpha determination module 56 may be an alpha blending module, and destination alpha determination module 56 may generate a destination alpha value in response to processing a received source pixel based on an alpha blending function. The particular function used for updating the destination alpha value is typically configurable by the graphics processor. The alpha blending function may be, in some cases, a front-to-back alpha blending function. An example set of front-to-back alpha blending functions may include the following functions:

$$Cdst[n]=(Adst[n-1]) \times (Asrc[n] \times Csrc[n]) + Cdst[n-1] \quad (3)$$

$$Adst[n]=(1-Asrc[n]) \times (Adst[n-1]) \quad (4)$$

where p[0], p[1] . . . p[n−1] are n previously processed source pixels, p[n] is the currently processed source pixel (i.e., the current source pixel), Cdst[n] is a destination color value generated in response to processing the current source pixel, Adst[n] is a destination alpha value generated in response to processing the current source pixel, Cdst[n−1] is a destination color value generated in response to processing the previously processed source pixel (i.e., p[n−1]), Adst[n−1] is a destination alpha value generated in response to processing the previously processed source pixel (i.e., p[n−1]), Csrc[n] is a source color value that corresponds to the current source pixel, and Asrc[n] is a source alpha value that corresponds to the current source pixel. In equations (1) and (2), for any value i, Adst[i]=0 may be indicative of a completely opaque destination pixel and Adst[i]=1 may be indicative of a completely transparent destination pixel. Adst[−1] and Cdst[−1] may be initialized to appropriate default values (e.g., values of 1 and 0, respectively). In some examples, the Asrc[n]×Csrc[n] multiply may be performed in a shader (e.g., a pixel shader), while the other math operations are performed as part of destination alpha determination module 56.

Texture buffer 58 is configured to store texture values for retrieval by texture mapping module 54. The texture values, in some examples, may correspond to the color values defined in an application surface. Texture buffer 58 may be implemented in system memory 10 in some examples, or in another memory (not shown) in other examples. In some implementations, all or part of texture buffer 58 may be stored in a cache. Texture buffer 58 is communicatively coupled to texture mapping module 54.

Destination alpha buffer 60 is configured to store destination alpha values generated by destination alpha determination module 56 and to provide the stored destination alpha values to destination alpha testing module 52 and destination alpha determination module 56 for further processing. Destination alpha buffer 60 may include a plurality of destination alpha values where each of the destination alpha values corresponds to a particular pixel location in screen space.

In some examples, destination alpha buffer 60 may be a frame buffer (e.g., frame buffer 40 in FIG. 2) that includes destination alpha values and/or color values for the destination pixels that form a graphics image. For example, the frame buffer may store Red, Green, Blue, and Alpha (RGBA) components for a plurality of destination pixels. The "A" component of the RGBA components for a particular destination pixel may correspond to the destination alpha value for that pixel. In some cases, the frame buffer may be subdivided into a color sub-buffer and a destination alpha sub-buffer, and color data (e.g., RGB) may be stored in the color sub-buffer and the destination alpha values (e.g., the "A" component) may be stored in the destination alpha sub-buffer.

In further examples, destination alpha buffer 60 may be a bin buffer that includes destination alpha values and/or color values for a subset of the destination pixels of a graphics image. The bin buffer may store similar data for the subset of the destination pixels as that which is described above with respect to the frame buffer. The bin buffer may, in some examples, be accessible to destination alpha testing module 52 via a communication interface that has a higher bandwidth than a communication interface used to access the frame buffer.

Each source pixel received by destination alpha testing module 52, texture mapping module 54 and destination alpha determination module 56 corresponds to a particular pixel location in screen space. For example, each source pixel may include positional coordinates that are indicative of the pixel location corresponding to the pixel. Thus, each source pixel maps to a corresponding destination pixel and destination alpha value in destination alpha buffer 60.

In some examples, destination alpha buffer 60 may have an available read bandwidth that is higher than the available read bandwidth of texture buffer 58. For example, texture buffer 58 may be an off-chip memory that is coupled to GPU 12 by one or more buses (e.g., buses 20 and/or 22 in FIG. 1), and destination alpha buffer 60 may be an on-chip cache that is not necessarily coupled to GPU 12 via the one or more buses. By discarding source pixels prior to texture mapping module 54, the number of source reads that need to be performed from texture buffer 58 may be reduced, thereby reducing the overall memory access bandwidth needed for graphics processing pipeline 50.

Pixel processing pipeline 50 may, in some examples, perform processing at the sample level as opposed to the pixel level. In such examples, each pixel may be associated with a plurality of samples, and each sample may be associated with a single pixel. In addition, each sample may be associated with its own destination alpha value in destination alpha buffer 60. In order to determine whether to perform the action that causes one or more texture values for a source pixel to not be retrieved from texture buffer 58, destination alpha testing module 52 may compare the destination alpha value associated with each sample of a source pixel to a threshold value, and determine whether the destination alpha values for all of the samples associated with the source pixel are less than or equal to the threshold value. If the destination alpha values for all of the samples associated with the source pixel are less than or equal to the threshold value, then destination alpha testing module 52 may discard all samples associated with the source pixel. Otherwise, if the destination alpha values for at least one of the samples associated with the source pixel is not less than or equal to the threshold value, then destination alpha testing module 52 may pass all of the samples associated with the source pixel onto the set of subsequent processing stages for further processing.

Multiple source pixels may be associated with the same screen pixel location because multiple overlapping surfaces and/or primitives may be rendered for a single graphics image. As used herein, one surface may overlap within another surface if both surfaces have at least one pixel that maps to the same pixel location in screen space. The destination alpha value for a particular screen pixel location may be incrementally updated each time a source pixel corresponding to the particular screen location is processed by destination alpha determination module 56. The updated destination alpha value may be dependent on the previous destination alpha value for the same pixel location. Thus, the destination alpha value stored in destination alpha buffer 60 represents a "composite" alpha value that is indicative of an opacity of a destination pixel at a given point in time based on all source pixels that have been processed by destination alpha determination module 56 for that destination pixel up to the given point in time.

It should be noted that, in some examples, when a destination alpha value is retrieved by destination alpha testing module 52 for a received source pixel, there may be other source pixels that are still being processed by pixel processing pipeline 50 and have not yet reached destination alpha determination module 56. As such, the destination alpha value retrieved by destination alpha testing module 52 for a particular source pixel may not reflect the contribution of every source pixel that has begun processing in pixel processing pipeline 50 prior to the current source pixel. In other words, the destination alpha value retrieved by destination alpha testing module 52 may be a "stale" or an "old" destination value. Nevertheless, even if a so-called "stale" destination alpha value is retrieved, if such a destination alpha value indicates that the destination pixel has reached a threshold level of opacity, destination alpha testing module 52 may still safely discard the source pixel because, once a destination alpha value achieves a threshold level of opacity, the destination alpha value does not subsequently become less opaque while rendering the same frame. Accordingly, the techniques of this disclosure may still be effective in reducing system bandwidth even if the most up-to-date destination alpha value has not been retrieved.

It should be further noted that the destination alpha testing techniques in this disclosure are different from the source alpha tests that are commonly found in graphics processors and from the alpha blending functions commonly found in graphics processors. A source alpha test may discard pixels based on a source alpha value that is included with each source pixel being processed. Unlike the destination alpha value, which is a composite alpha value for all source pixels processed for a given pixel location up to a given point in time, the source alpha value is an alpha value that is specific to each source pixel and is not a composite alpha value. Moreover, while the destination alpha values used by destination alpha testing module 52 are retrieved from destination alpha buffer 60, e.g., a frame buffer or a bin buffer, the source alpha values used by source alpha tests are typically included within the received source pixel itself. Therefore, the source alpha values used in conventional source alpha testing are typically received directly from the prior processing stage, and not retrieved from a frame buffer or bin buffer.

Although the prior art source alpha testing block and the prior art alpha blending block are different from the destination alpha testing module described in this disclosure, one or both of the source alpha testing block and the alpha blending block may be used in conjunction with the destination alpha testing module of this disclosure. In cases where a front-to-back rendering order is used, the alpha blending block may be configured to use a front-to-back alpha blending equation rather than a back-to-front alpha blending equation, which is typically used when rendering according to a painter's algorithm.

Figure 4:
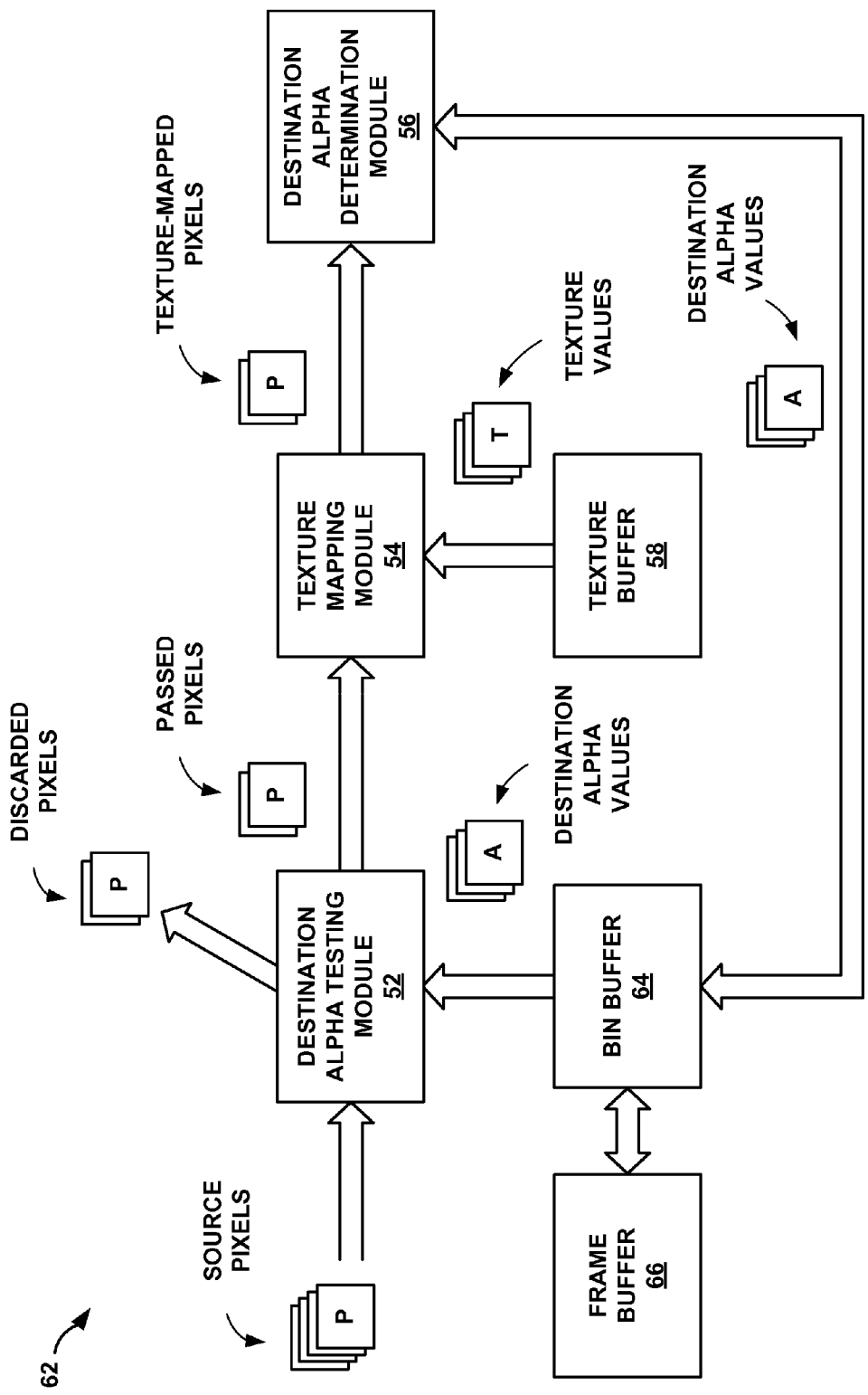
FIG. 4 is block diagram illustrating an example pixel processing pipeline that may be used to implement the pixel processing pipeline of FIG. 3.

FIG. 4 is block diagram illustrating an example pixel processing pipeline 62 that may be used to implement pixel processing pipeline 50 of FIG. 3. Pixel processing pipeline 62 includes a destination alpha testing module 52, a texture mapping module 54, a destination alpha determination module 56, a texture buffer 58, a bin buffer 64 and a frame buffer 66. As shown in FIG. 4, the architecture of pixel processing pipeline 62 is similar to that of pixel processing pipeline 50 shown in FIG. 3 except that destination alpha buffer 60 has been replaced by bin buffer 64 and frame buffer 66. Similarly numbered components in FIGS. 3 and 4 have the same or similar functionality and construction. Accordingly, in the interest of brevity and to avoid redundancy, the operation and construction of these shared components will not be described in further detail.

Bin buffer 64 may implement the functionality of destination alpha buffer 60 in FIG. 3 with respect to a subset of the destination pixels in frame buffer 66. Frame buffer 66 may correspond to frame buffer 40 illustrated in and described with respect to FIG. 2. Frame buffer 66 may store color components and a destination alpha value for each of the destination pixels in screen space. For example, frame buffer 66 may store RGBA components for each of the destination pixels, and the alpha ("A") component of the RGBA components may correspond to the destination alpha values used by destination alpha testing module 52. Frame buffer 66 may reside in system memory 10. In some cases, frame buffer 66 may be subdivided into a color sub-buffer and a destination alpha sub-buffer, and color data (e.g., RGB) may be stored in the color sub-buffer and the destination alpha values (e.g., the "A" component) may be stored in the destination alpha sub-buffer.

Bin buffer 64 may store color components and a destination alpha value for a subset of the pixels in frame buffer 66. For example, bin buffer 64 may store RGBA components for destination pixels within a tile of pixels of a specified size, e.g., a 16×16 tile of destination pixels. In some examples, bin buffer 64 may be an on-chip memory. In other words, bin buffer 64 may reside on the same microchip as pixel processing pipeline 62 of GPU 12. In such examples, frame buffer 40 may be an off-chip memory, e.g., frame buffer 40 may reside on a second microchip that is different than the microchip on which GPU 12 and bin buffer 64 reside.

The initialization of bin buffer 64 and the writing of data from bin buffer 64 into frame buffer 66 may, in some examples, be synchronized with the processing of bins or tiles of primitives. For example, when a new bin of primitives is about to be processed, pixel processing pipeline 62 may cause bin buffer 64 to write the destination pixel data stored in bin buffer 64 for the previously processed bin of primitives into frame buffer 66, and initialize the data values in bin buffer to default values.

In some examples, destination alpha testing module 52 may retrieve destination alpha values from bin cache 64 via a first communication interface, texture mapping module 54 may retrieve texture values from texture buffer 58 via a second communication interface, and frame buffer 66 may be accessible to pixel processing pipeline 62 via a third communication interface. In such examples, the first communication interface may have, in some examples, a higher bandwidth than the second communication interface and/or the third communication interface. In some cases, the second communication interface may be the same communication interface as the third communication interface, e.g., when frame buffer 40 and texture buffer 42 are both implemented in system memory 10. The second communication interface and the third communication interface, in some examples, may correspond to busses 20 and/or 22 in FIG. 1. When bin buffer 64 is an on-chip bin buffer, the first communication interface may be a communication interface that is internal to GPU 12.

In additional examples, the capacity of bin buffer 64 may be less than the capacity of frame buffer 66, which may be configured to store all of a plurality of destination pixels associated with a graphics image. Consequently, in such examples, the capacity of bin buffer 64 may be less than a minimum capacity needed to store pixel data for all of a plurality of destination pixels associated with a graphics image.

The destination alpha value-based selective texture value retrieval techniques of this disclosure may be particularly useful in the context of the binning architecture shown in FIG. 4 because the destination alpha values for a particular bin may already be loaded into bin buffer 64 when needed by destination alpha testing module 52. This may alleviate the need to access such values from frame buffer 66, which may be located in a memory that is accessible via a communication interface with lower available bandwidth, e.g., system memory 10. Therefore, by implementing the techniques of this disclosure in a binning context, as shown in FIG. 4 for example, the overhead bandwidth that may be needed to retrieve the destination alpha values may be relatively minimal compared to the bandwidth savings achieved by reducing the number of source reads to texture buffer 58.

Figure 5:
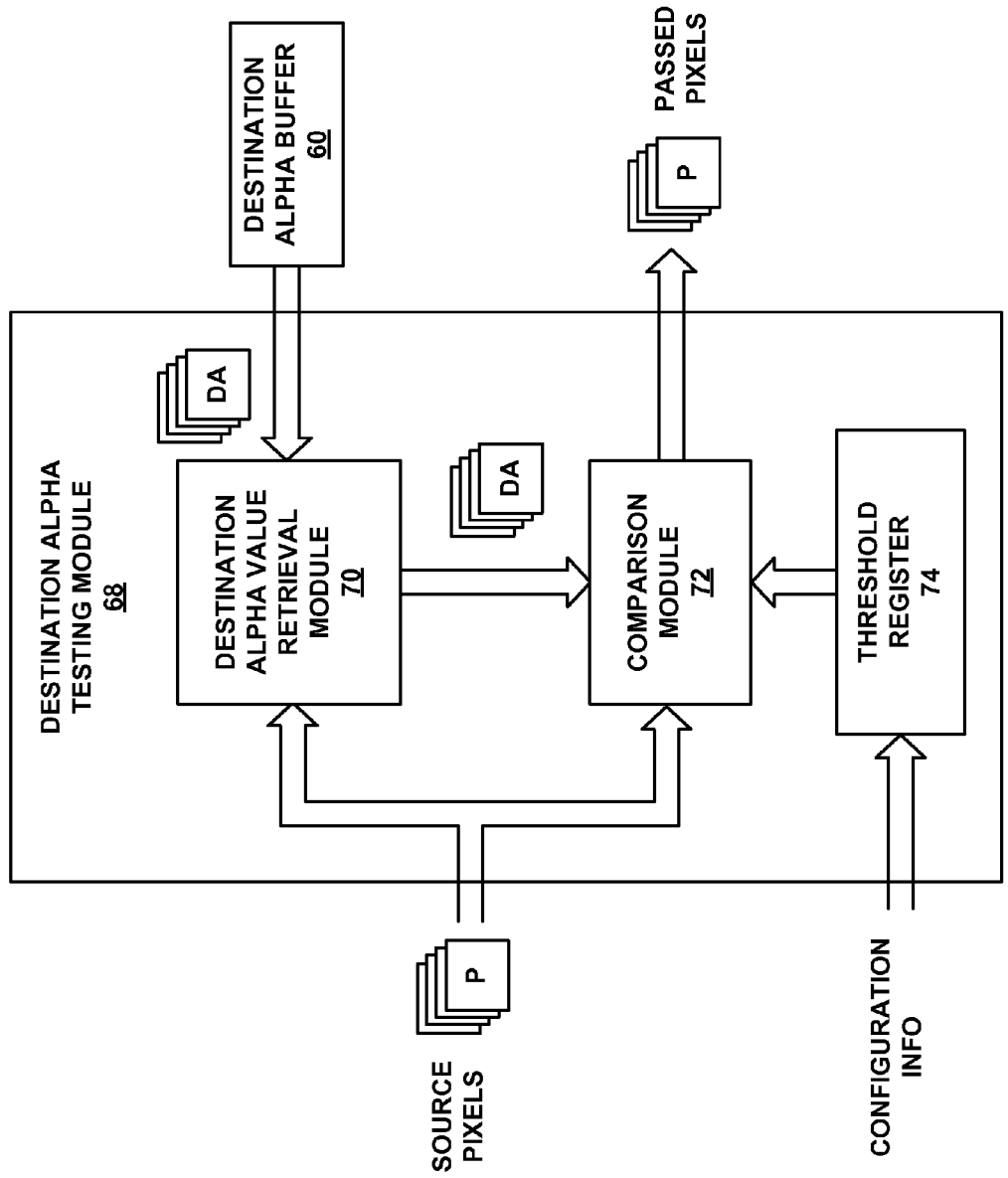
FIG. 5 is a block diagram illustrating an example destination alpha testing module that may be used to implement the techniques of this disclosure.

FIG. 5 is a block diagram illustrating an example destination alpha testing module 68 that may be used to implement the techniques of this disclosure. In some examples, destination alpha testing module 68 may correspond to destination alpha testing module 52 illustrated in FIGS. 3 and 4. Destination alpha testing module 68 is configured to receive one or more source pixels, perform a destination alpha test on the received pixels, and selectively discard individual pixels based on results of the destination alpha test. Destination alpha testing module 68 includes a destination alpha retrieval module 70, a comparison module 72 and a threshold register 74.

Destination alpha retrieval module 70 may be configured to receive a source pixel that includes positional coordinate data, determine the positional coordinates of the source pixel based on the positional coordinate data, retrieve a destination alpha value from destination alpha buffer 60 based on the positional coordinates of the source pixel, and provide the retrieved destination alpha value to comparison module 72 for comparison. The retrieved destination alpha value may have the same positional coordinates as the source pixel.

Comparison module 72 may be configured to receive a destination alpha value from destination alpha retrieval module 70 and a threshold value from threshold register 74, and to compare the destination alpha value to the threshold value. Based on the comparison, comparison module 72 may either pass the source pixel onto one or more processing stages or discard the pixel, i.e., not pass the source pixel onto any subsequent processing stages. In some examples, comparison module 72 may compare the destination alpha value to the threshold by determining whether the destination alpha value is less than or equal to the threshold. If the destination alpha value is less than or equal to the threshold, then comparison module 72 may, in some examples, discard the source pixel. On the contrary, if the destination alpha value is not less than or equal to the threshold, then comparison module 72 may, in some examples, pass the pixel onto one or more subsequent processing stages, i.e., not discard the source pixel. Other threshold comparison functions may be used in other examples. In this manner, destination alpha testing module 68 may selectively discard source pixels based on destination alpha values corresponding to the source pixels.

Threshold register 74 may store a threshold value indicative of a threshold level of opacity at or below which the source pixel may be discarded. For example, when destination alpha testing module 68 processes a source pixel having a particular screen pixel location, the threshold level of opacity may indicate a level of opacity for the corresponding destination pixel at or below which the source pixel will not be visible such that the source pixel does not need to be displayed. As shown in FIG. 5, threshold register 74 is configured to receive configuration information which may include information indicating a particular threshold value to store in threshold register 74. Threshold register 74 may receive the configuration information from, e.g., a user software application executing on a host CPU, a GPU driver executing on the host CPU, a hardware component that resides on the GPU and/or a shader executing on the GPU.

Figure 6:
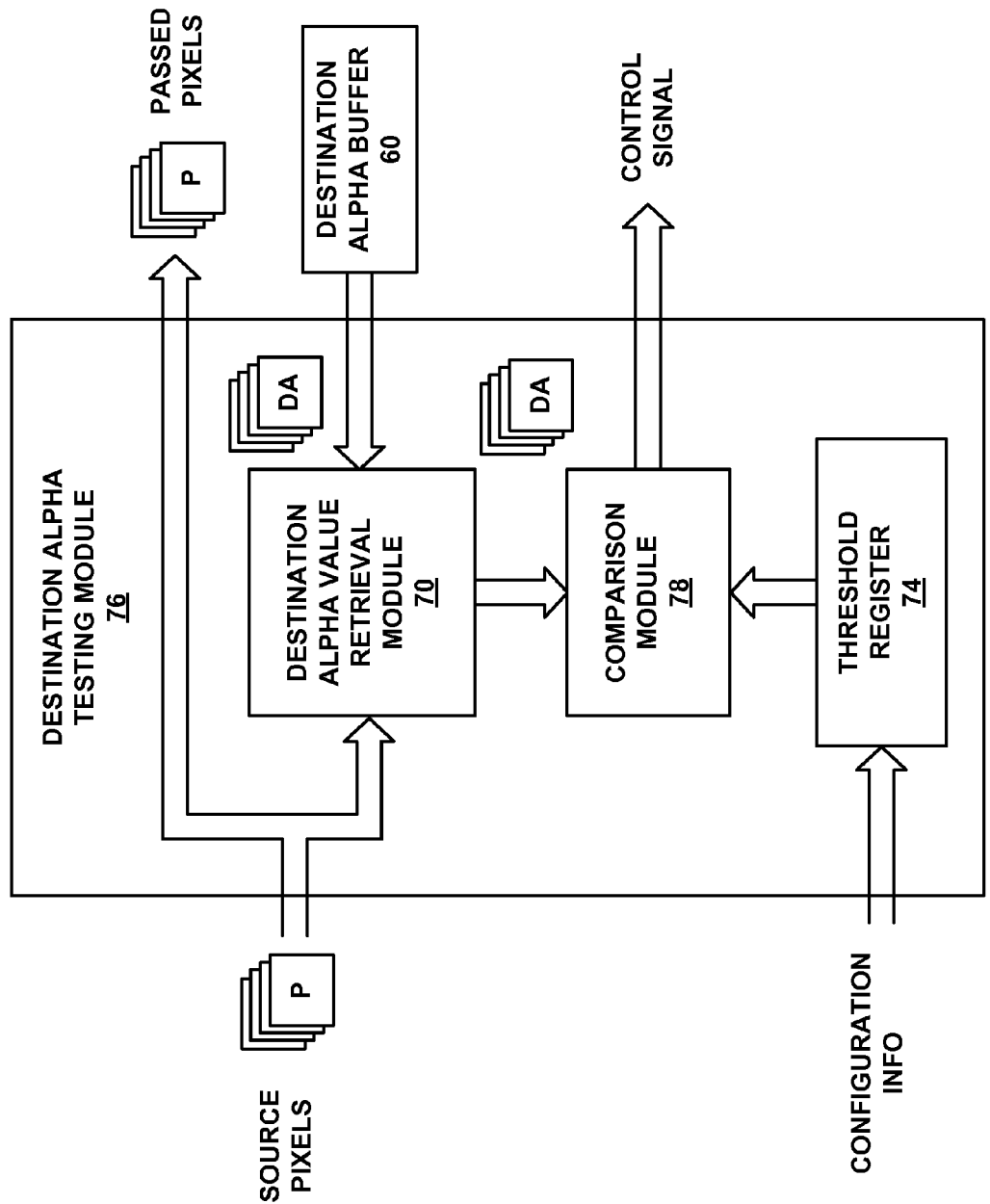
FIG. 6 is a block diagram illustrating another example destination alpha testing module that may be used to implement the techniques of this disclosure.

FIG. 6 is a block diagram illustrating another example destination alpha testing module 76 that may be used to implement the techniques of this disclosure. In some examples, destination alpha testing module 76 may replace destination alpha testing module 52 illustrated in FIGS. 3 and 4. Destination alpha testing module 76 is configured to receive one or more source pixels, perform a destination alpha test on the source pixels, and selectively activate a control signal in response to the comparison. Destination alpha testing module 68 includes a destination alpha retrieval module 70, a comparison module 78 and a threshold register 74. As shown in FIG. 6, the architecture of destination alpha testing module 76 is similar to that of destination alpha testing module 68 shown in FIG. 5 except that comparison module 72 has been replaced by comparison module 78 and all source pixels are passed onto a subsequent processing stage. Similarly numbered components in FIGS. 5 and 6 have the same or similar functionality and construction. Accordingly, in the interest of brevity and to avoid redundancy, the operation and construction of these shared components will not be described in further detail.

Comparison module 78 may perform similar comparison operations to those which are described above with respect to comparison module 72 in FIG. 5. However, instead of selectively discarding source pixels in response to the comparison operations, comparison module 78 may selectively activate and deactivate a control signal. The control signal may be supplied to one or more subsequent processing stages in the pixel processing pipeline in order to selectively enable and disable the retrieval of texture values for the corresponding source pixel. For example, rather than discarding a source pixel at destination alpha testing module 76, another processing stage may discard the source pixel based on the control signal. As another example, a texture mapping module may receive the control signal, and selectively enable or disable texture value retrieval for a source pixel based on the control signal.

The example destination alpha testing module 76 in FIG. 6 illustrates another example destination alpha testing module configuration that may be used to selectively control the retrieval of texture values in a pixel processing pipeline in addition to or in lieu of the configuration illustrated in FIG. 5. Other destination alpha testing module configurations are contemplated and within the scope of this disclosure. For example, another example destination alpha testing module configuration may modify a pixel attribute indicative of whether texture values should be retrieved for the source pixel, and a texture mapping module may selectively retrieve texture values for the source pixel based on the pixel attribute.

In some examples, a pixel processing pipeline designed in accordance of with the techniques of this disclosure may include a processing unit that performs a stencil test. The processing unit may be, for example, a stencil testing block and/or a combined z/stencil testing block. In such examples, a GPU may, in some examples, implement the destination alpha testing functionality described in this disclosure by configuring the processing unit that performs the stencil test to receive a destination alpha value in place of a stencil value. Then, the processing unit may be used to perform a destination alpha test and to selectively cause texture values to be retrieved for a source pixel based on a destination alpha value according to the techniques of this disclosure. These techniques are described in further detail with respect to FIGS. 7-10.

Figure 7:
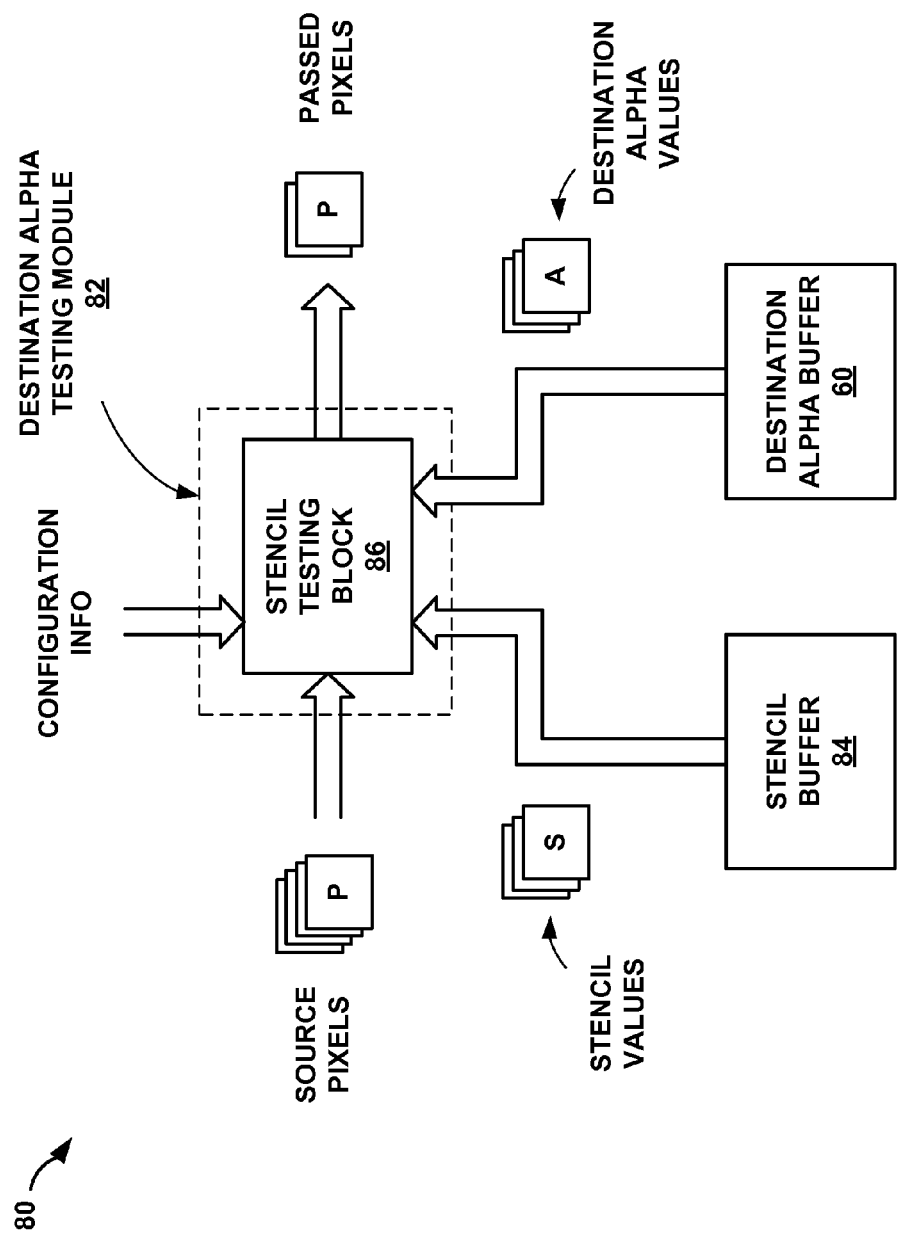
FIG. 7 is a block diagram illustrating an example pixel processing pipeline that uses a configurable stencil testing block to perform destination alpha testing and to implement the selective texture value retrieval techniques of this disclosure.

FIG. 7 is a block diagram illustrating an example pixel processing pipeline 80 that uses a configurable stencil testing block to perform destination alpha testing and to implement the selective texture value retrieval techniques of this disclosure. Pixel processing pipeline 80 includes a destination alpha testing module 82, a stencil buffer 84 and a destination alpha buffer 60. Destination alpha testing module 82 includes configurable stencil testing block 86. Stencil buffer 84 may be configured to store stencil values for pixel processing pipeline

80. In some examples, stencil buffer 84 may reside in an off-chip system memory, e.g., system memory 10 shown in FIG. 1. In further examples, stencil buffer 84 may be a z/stencil buffer similar to the z/stencil buffer described with respect to FIG. 9 and may store z-values and stencil values associated with the destination pixels in a frame buffer. Destination alpha buffer 60 may be, e.g., a frame buffer or a bin buffer. When destination alpha buffer 60 is a bin buffer, destination alpha buffer 60 may, in some examples, reside on the same microchip as the GPU that includes pixel processing pipeline 80.

Destination alpha testing module 82 may be configured to receive a source pixel from a prior processing stage in the GPU, retrieve a destination alpha value that corresponds to the source pixel, compare the destination alpha value to a threshold, and selectively discard the source pixel based on results of the comparison. As shown in FIG. 7, destination alpha testing module 82 is implemented as a configurable stencil testing block 86. Configurable stencil testing block 86 may be configurable to operate in a stencil testing state and in a destination alpha testing state. When configured to operate in the stencil testing state, stencil testing block 86 may receive a source pixel from a prior processing stage, retrieve a stencil value corresponding to the received source pixel from stencil buffer 84, compare the retrieved stencil value to a threshold, and selectively discard the source pixel based on results of the comparison. When configured to operate in the destination alpha testing state, stencil testing block 86 may perform essentially the same operations as when configured in the stencil testing state except that, rather than retrieving a corresponding stencil value from stencil buffer 84, stencil testing block 86 may retrieve a corresponding destination alpha value from destination alpha buffer 60. Thus, stencil testing block 86 may determine, based on a destination alpha value, whether to perform an action that causes one or more texture values for a source pixel to not be retrieved from a buffer, and to perform the action in response to determining to perform the action in accordance with the techniques of this disclosure.

Stencil testing block 86 may be configured to switch between configuration states based on configuration information received by stencil testing block 86. The configuration information may be received from another component within the GPU, from a GPU driver executing on a host CPU and/or from a user software application executing on the host CPU.

In some examples, the configuration information received by stencil testing block 86 may specify a memory address from which stencil testing block 86 should retrieve input values (e.g., stencil values and/or destination alpha values). In such examples, stencil testing block 86 may be configured to receive stencil values by providing a memory address to stencil testing block 86 that points to stencil buffer 84. In addition, stencil testing block 86 may be configured to receive destination alpha values in place of stencil values by providing a memory address to stencil testing block 86 that points to destination alpha buffer 60 instead of stencil buffer 84.

By reconfiguring a stencil testing block to retrieve destination alpha values in place of stencil values according to the techniques in this disclosure, a hardware-based destination alpha testing block may be implemented in a graphics processing pipeline without necessarily needing to add additional hardware blocks to the graphics pipeline. Moreover, a graphics processor may be able to selectively switch between two different rendering modes—a first mode that performs hardware-based stencil testing and a second mode that performs hardware-based destination alpha testing.

Figure 8:
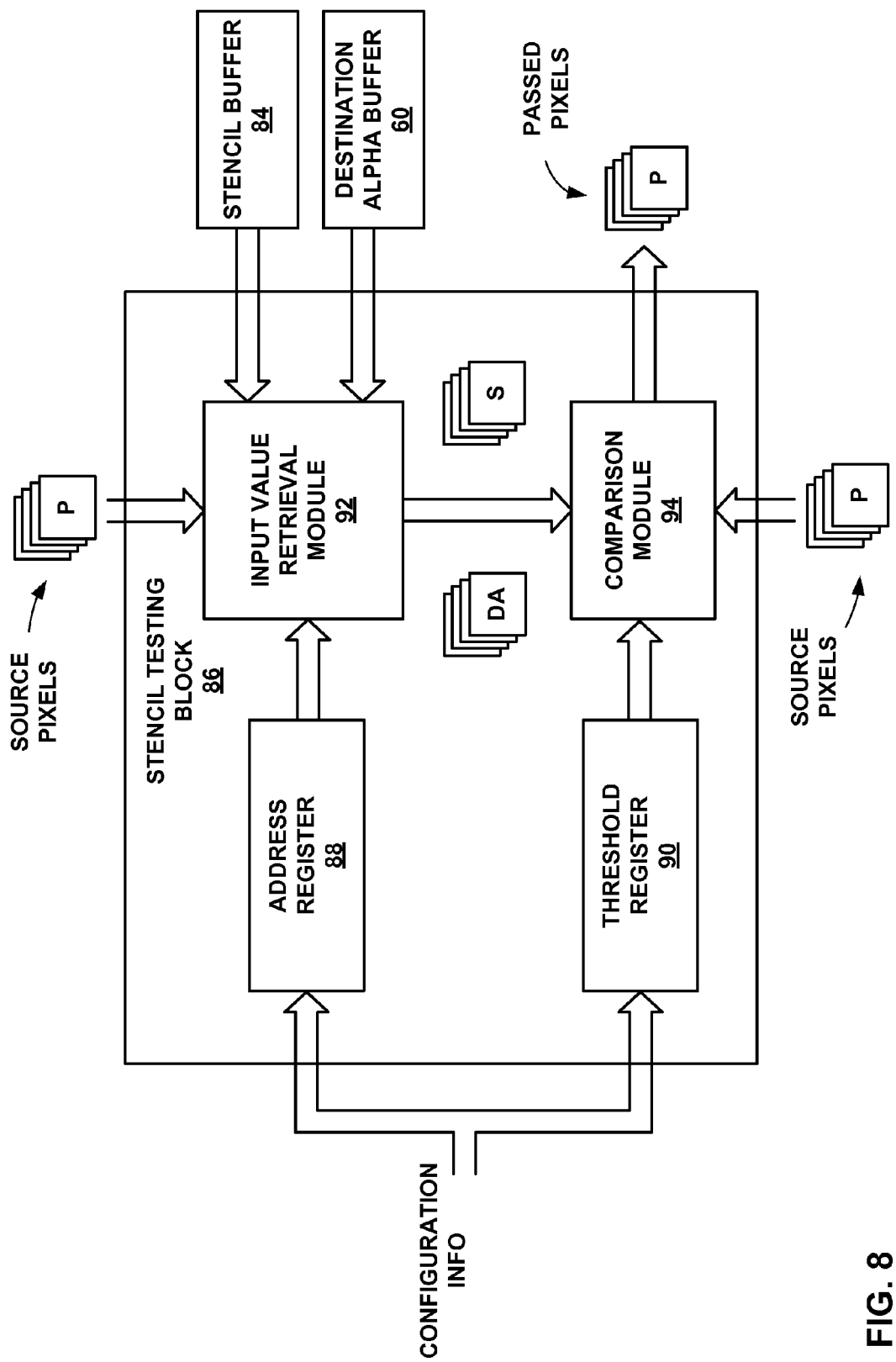
FIG. 8 is a block diagram illustrating an example configurable stencil testing block that may be used to implement the pixel processing pipeline of FIG. 7.

FIG. 8 is a block diagram illustrating an example stencil testing block 86 that may be used to implement the pixel processing pipeline of FIG. 7. Stencil testing block 86 includes an address register 88, a threshold register 90, an input value retrieval module 92 and a comparison module 94.

Address register 88 may be configured to store a memory address from which input value retrieval module 92 should retrieve input values. A user application, a GPU driver and/or a GPU component may configure stencil testing block 86 to retrieve stencil values by loading an address value into address register 88 that points to an address space for stencil buffer 84. Similarly, the user application, the GPU driver and/or the GPU component may configure stencil testing block 86 to retrieve destination alpha values by loading an address value into address register 88 that points to an address space for destination alpha buffer 60.

Threshold register 90 may store a threshold value for use by comparison module 94. When stencil testing block 86 is configured to perform stencil testing, the threshold value may be indicative of a reference value for a stencil test. When stencil testing block 86 is configured to perform destination alpha testing, the threshold value may be indicative of a threshold level of opacity at or below which the source pixel may be discarded. A user application, a GPU driver and/or a GPU component may configure threshold register 90 to store a particular threshold level by loading a threshold value into threshold register 90.

Input value retrieval module 92 may be configured to receive a source pixel that includes positional coordinate data, determine the positional coordinates of the source pixel based on the positional coordinate data, retrieve an input value from a memory or cache based on the positional coordinates, and provide the input value to comparison module 94 for comparison. The retrieved input value may be associated with the same positional coordinates as the source pixel. Input value retrieval module 92 may retrieve the input value from a memory location and/or cache location that is determined at least in part by the memory address stored in address register 88. When the memory address stored in address register 88 points to stencil buffer 84, input value retrieval module 92 may retrieve a stencil value that corresponds to the source pixel and provide the stencil value to comparison module 94 for comparison. Similarly, when the memory address stored in address register 88 points to destination alpha buffer 60, input value retrieval module 92 may retrieve a destination alpha value that corresponds to the source pixel and provide the destination alpha value to comparison module 94 for comparison.

Comparison module 94 may be configured to receive an input value from input value retrieval module 92 and a threshold value from threshold register 90, and to compare the input value to the threshold value. Based on the comparison, comparison module 94 may either pass the source pixel onto one or more processing stages or discard the pixel, i.e., not pass the source pixel onto any subsequent processing stages. In some examples, comparison module 94 may compare the input value to the threshold by determining whether the input value is less than or equal to the threshold. If the input value is less than or equal to the threshold, comparison module 94 may, in some examples, discard the source pixel. On the contrary, if the input value is not less than or equal to the threshold, comparison module 94 may, in some examples, pass the pixel onto one or more subsequent processing stages, i.e., not discard the source pixel. Other threshold comparison functions may be used in other examples. Again, the input value may correspond to a stencil value or a destination alpha value depending on from which memory space input value retrieval module 92 retrieved the data. In this manner, stencil testing block 86 may be configurable to operate as a stencil testing block or as a destination alpha testing block.

Figure 9:
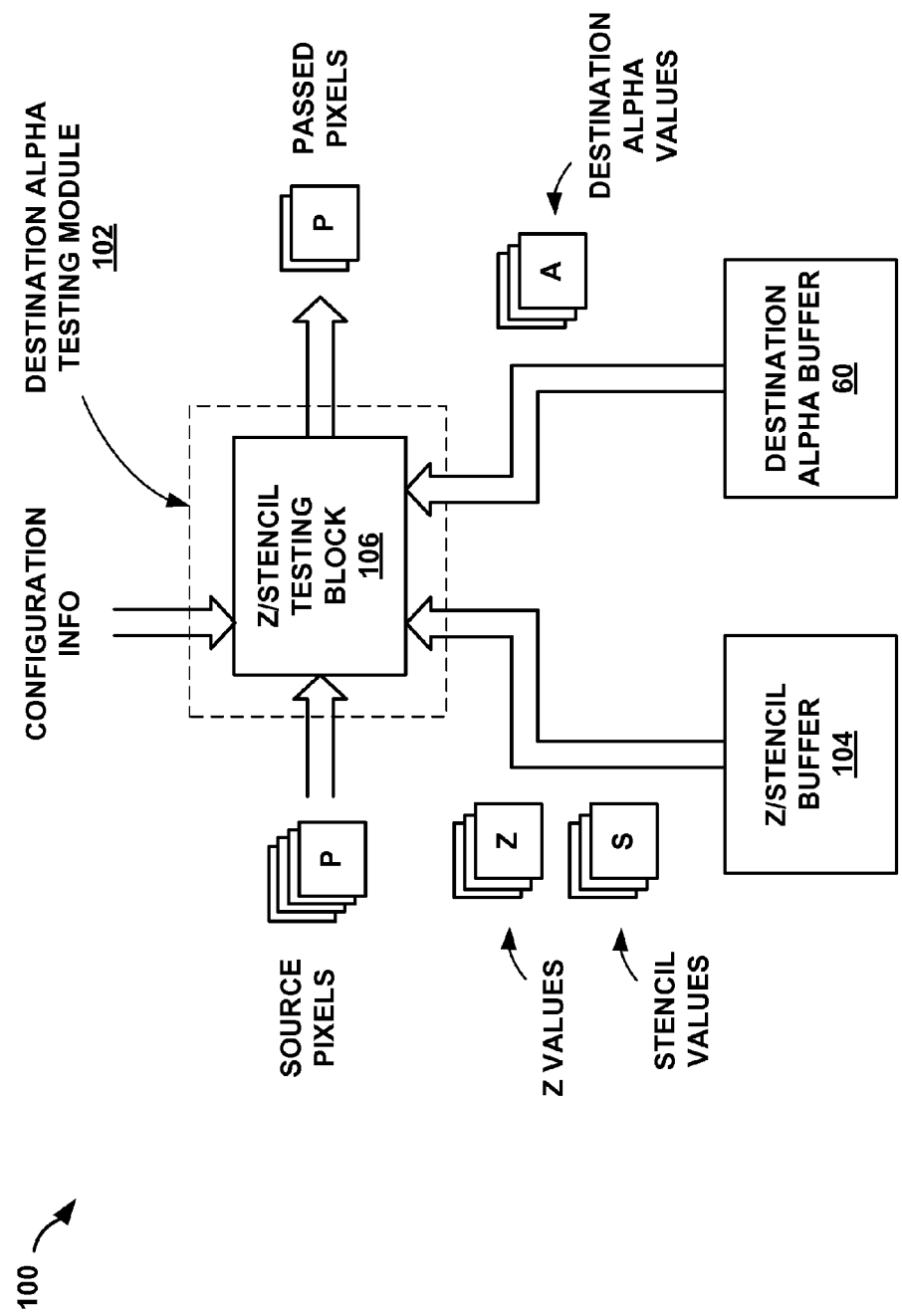
FIG. 9 is a block diagram illustrating an example pixel processing pipeline that uses a configurable z/stencil testing block to perform destination alpha testing according to the selective texture value retrieval techniques of this disclosure.

FIG. 9 is a block diagram illustrating an example pixel processing pipeline 100 that uses a configurable z/stencil testing block 106 to perform destination alpha testing according to the selective texture value retrieval techniques of this disclosure. Pixel processing pipeline 100 includes a destination alpha testing module 102, a z/stencil buffer 104 and a destination alpha buffer 60. Destination alpha testing module 102 includes a combined, configurable z/stencil testing block 106. Z/stencil buffer 104 may be configured to store stencil values and z-values for pixel processing pipeline 100. In some examples, z/stencil buffer 104 may reside in an off-chip system memory, e.g., system memory 10 shown in FIG. 1. Destination alpha buffer 60 may be, e.g., a frame buffer or a bin buffer. When destination alpha buffer 60 is a bin buffer, destination alpha buffer 60 may, in some examples, reside on the same microchip as the GPU that includes pixel processing pipeline 100.

Destination alpha testing module 102 is configured to receive a source pixel from a prior processing stage in the GPU, retrieve a destination alpha value that corresponds to the source pixel, compare the destination alpha value to a threshold, and selectively discard the source pixel based on results of the comparison. As shown in FIG. 9, destination alpha testing module 102 is implemented as a configurable z/stencil testing block 106. Configurable z/stencil testing block 106 may be configurable to operate in a z-stencil testing state and in a destination alpha testing state. When configured to operate in the z-stencil testing state, z/stencil testing block 106 may perform one or both of a stencil test and a z-test on a received source pixel. The stencil test is performed in a substantially similar manner to that which was described above with respect to stencil block 86 in FIG. 7 except that the stencil values are retrieved from z/stencil buffer 104 instead of stencil buffer 84.

To perform a z-test, z/stencil testing block 106 may receive a source pixel from a prior processing stage, retrieve a z-value corresponding to the received source pixel from z/stencil buffer 104, compare the retrieved z-value to a source z-value included with the source pixel, and selectively discard the source pixel based on results of the comparison. When configured in the destination alpha testing state, z/stencil buffer 104 may perform essentially the same operations as performed by the stencil test, but rather than retrieving a corresponding stencil value from z/stencil buffer 104, z/stencil testing block 106 may retrieve a corresponding destination alpha value from destination alpha buffer 60. Thus, z/stencil testing block 106 may determine, based on a destination alpha value, whether to perform an action that causes one or more texture values for a source pixel to not be retrieved from the buffer, and to perform the action in response to determining to perform the action in accordance with the techniques of this disclosure.

Z/stencil testing block 106 may be configured to switch between configuration states based on configuration information received by z/stencil testing block 106. The configuration information may be received from another component within the GPU, from a GPU driver executing on a host CPU and/or from a user software application executing on the host CPU.

In some examples, the configuration information received by z/stencil testing block 106 may specify a memory address from which z/stencil testing block 106 should retrieve input values (e.g., stencil values and/or destination alpha values). In such examples, z/stencil testing block 106 may be configured to receive destination alpha values by providing a memory address to z/stencil testing block 106 that points to z/stencil buffer 104. In addition, z/stencil testing block 106 may be configured to receive destination alpha values in place of the stencil values and/or z-values by providing a memory address to z/stencil testing block 106 that points to destination alpha buffer 60 instead of z/stencil buffer 104.

By reconfiguring a z-stencil testing block to retrieve destination alpha values in place of z-stencil values according to the techniques in this disclosure, a hardware-based destination alpha testing block may be implemented in a graphics processing pipeline without necessarily needing to add additional hardware blocks to the graphics pipeline. Moreover, a graphics processor may be able to selectively switch between at least two different rendering modes: a first mode that performs hardware-based combined z-stencil testing and a second mode that performs hardware-based destination alpha testing.

In some examples, when z/stencil testing block 106 is configured to operate in the destination alpha testing mode, the z-test portion of z/stencil testing block 106 may be placed into a "pass-always" mode that causes all pixels to pass the z-test such that no pixels are discarded due to z-testing. In other words, the z-test may be effectively disabled. Z/stencil testing block 106 may be placed into the "pass-always" mode in these examples because, when z/stencil testing block 106 is reconfigured to receive data from destination alpha buffer 60, z/stencil testing block 106 may not necessarily receive z-values. Rather, z/stencil testing block 106 may receive color values, e.g., RGB values from destination alpha buffer 60. Placing z/stencil testing block 106 into a "pass-always" mode ensures that the z-test does not inadvertently discard pixels based on the color values.

Figure 10:
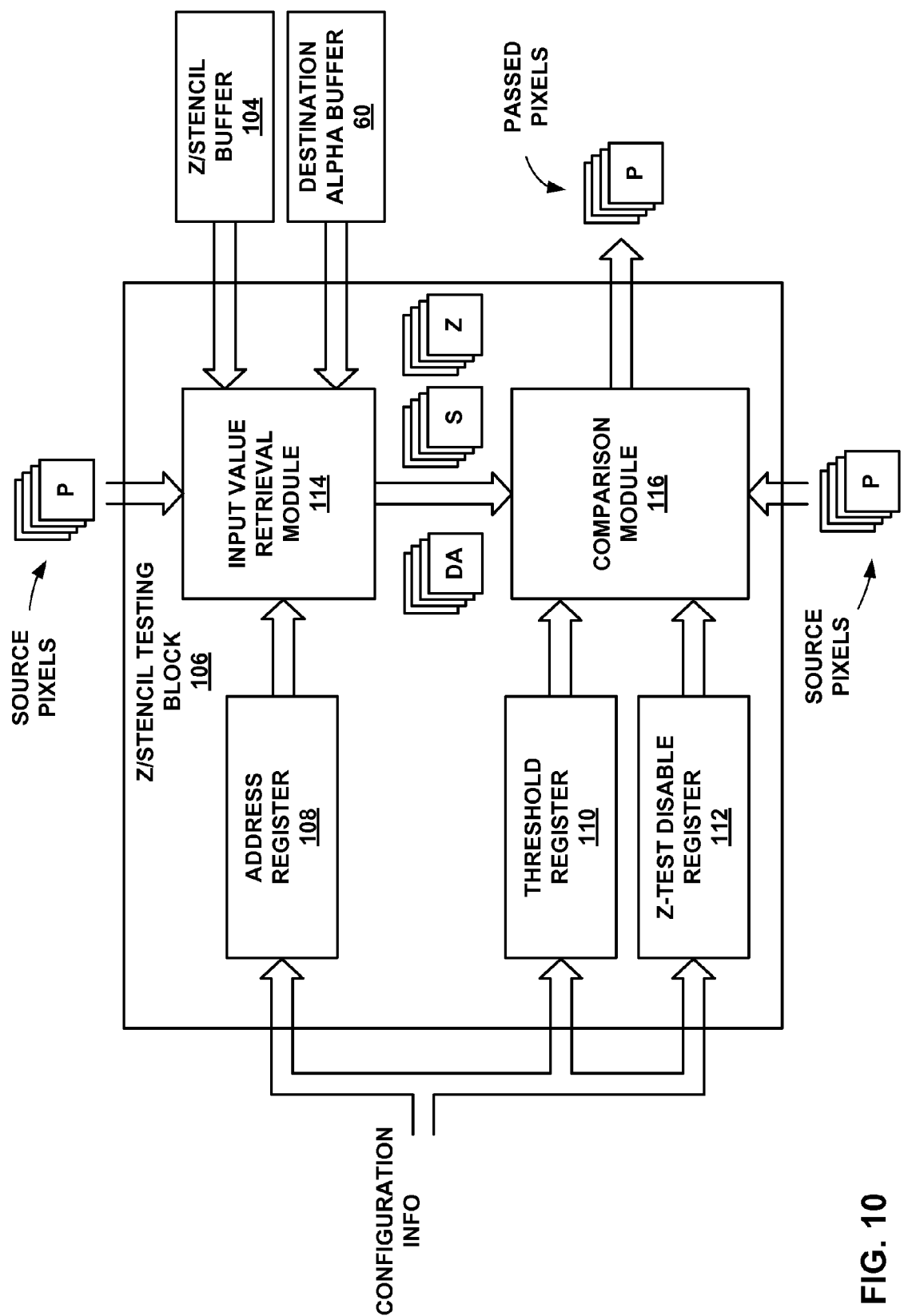
FIG. 10 is a block diagram illustrating an example configurable z/stencil testing block that may be used to implement the pixel processing pipeline of FIG. 9.

FIG. 10 is a block diagram illustrating an example z/stencil testing block 106 that may be used to implement the pixel processing pipeline of FIG. 9. Z/stencil testing block 106 includes an address register 108, a threshold register 110, a z-test disable register 112, an input value retrieval module 114 and a comparison module 116.

Address register 108 may be configured to store a memory address from which input value retrieval module 114 should retrieve input values. A user application, a GPU driver and/or a GPU component may configure input value retrieval module 114 to retrieve z-stencil values (i.e., z-values and stencil values) by loading an address value into address register 108 that points to an address space for z/stencil buffer 104. Similarly, the user application, GPU driver and/or GPU component may configure input value retrieval module 114 to retrieve destination alpha values by loading an address value into address register 108 that points to an address space for destination alpha buffer 60.

Threshold register 110 may store a threshold value for use by comparison module 116. When z/stencil testing block 106 is configured to perform z-stencil testing (i.e., z-testing and/or stencil testing), the threshold value may be indicative of a reference value for a stencil test. When z/stencil testing block 106 is configured to perform destination alpha testing, the threshold value may be indicative of a threshold level of opacity at or below which the source pixel may be discarded. A user application, a GPU driver and/or a GPU component may configure threshold register 110 to store a particular threshold level by loading a threshold value into threshold register 110.

Z-test disable register 112 may store a value indicative of whether z-testing should be enabled or disabled for comparison module 116. A user application, a GPU driver and/or a GPU component may configure z-test disable register 112 to store a particular configuration value by loading a configuration value into z-test disable register 112.

Input value retrieval module 114 may be configured to receive a source pixel that includes positional coordinate data, determine the positional coordinates of the source pixel based on the positional coordinate data, retrieve an input value from a memory or cache based on the positional coordinates, and provide the input value to comparison module 116 for comparison. The retrieved input value may be associated with the same positional coordinates as the source pixel. Input value retrieval module 114 may retrieve the input value from a memory location and/or cache location that is determined at least in part by the memory address stored in address register 108. When the memory address stored in address register 108 points to z/stencil buffer 104, input value retrieval module 114 may retrieve z-stencil values that corresponds to the source pixel and provide the z-stencil values to comparison module 116 for comparison. Similarly, when the memory address stored in address register 108 points to destination alpha buffer 60, input value retrieval module 114 may retrieve a destination alpha value that corresponds to the source pixel and provide the destination alpha value to comparison module 116 for comparison.

Comparison module 116 may be configured to receive input data from input value retrieval module 114 that includes two different input values and to perform different comparison tests on each of the input values. As part of the first comparison test, comparison module 116 may compare a first input value received from input value retrieval module 114 to a threshold value received from threshold register 110. As part of a second comparison test, comparison module 116 may compare a second input value received from input value retrieval module 114 to a pixel attribute included within a source pixel. Based on the results of both of these comparison tests, comparison module 116 may either pass the source pixel onto one or more processing stages or discard the pixel, i.e., not pass the source pixel onto any subsequent processing stages. For example, if the source pixel passes both of the comparison tests, then comparison module 116 may pass the source pixel onto a subsequent stage for further processing. On the contrary, if the source pixel does not pass at least one of the tests, comparison module 116 may discard the source pixel. Comparison module 116 may selectively configure the second comparison test into a "pass always" mode based on the configuration value stored in z-test disable register 112. When the second comparison test is in a "pass always" mode, then the second comparison test is considered to have passed for all pixels regardless of the actual outcome of such a comparison if it was performed. Thus, the first comparison test becomes determinative of whether the source pixel will be discarded.

When comparison module 116 is configured to operate in the z-stencil testing configuration, comparison module 116 may use the first comparison test to perform a stencil test (e.g., by comparing a stencil value received from input value retrieval module 114 to a threshold in a similar fashion to that which was described above with respect to comparison module 94 in FIG. 8), and use the second comparison test to perform a z-test (e.g., by comparing a z-value received from input value retrieval module 114 to a source z-value attribute included within the source pixel). When comparison module 116 is configured to operate in the destination alpha testing configuration, the comparison module 116 may use the first comparison test to perform the destination alpha test (by comparing a destination alpha value received from input value retrieval module 114 to a threshold in a similar fashion to that which was described above with respect to comparison module 94 in FIG. 8), and comparison module 116 may disable the second comparison based on a disable configuration value stored in z-test disable register 112. In this manner, z/stencil testing block 106 may be configurable to operate as a z-stencil testing block or as a destination alpha testing block.

In some graphics processors, the z-values and the stencil values for a given pixel location may be stored as a single data word in z/stencil buffer 104. For example, the data word may be 32 bits with the z-value constituting 24 bits of the word and the stencil value constituting the remaining 8 bits. In such graphics processors, RGBA components may be stored in the frame buffer, and by extension in a bin buffer, in 32 bit words where the "RGB" components constitute 24 bits and the "A" component constitutes the remaining 8 bits. In such examples, the position of the alpha values within the 32 bit RGBA data word may map to the position where the stencil value is typically stored in the 32 bit z-value/stencil data word. In other words, the destination alpha value may align with bit positions within the data word where z/stencil testing block 106 typically expects to receive stencil values and the RGB values may align with bit positions in the data word where z/stencil testing block 106 typically expects to receive z-values. In this way, z/stencil testing block 106 may be able to operate on destination alpha values without necessarily needing to reconfigure the underlying data in z/stencil buffer 104. Moreover, by disabling the z-testing functionality when operating in the destination alpha testing mode, interference from receiving RGB values instead of z-values may be prevented.

Figure 11:
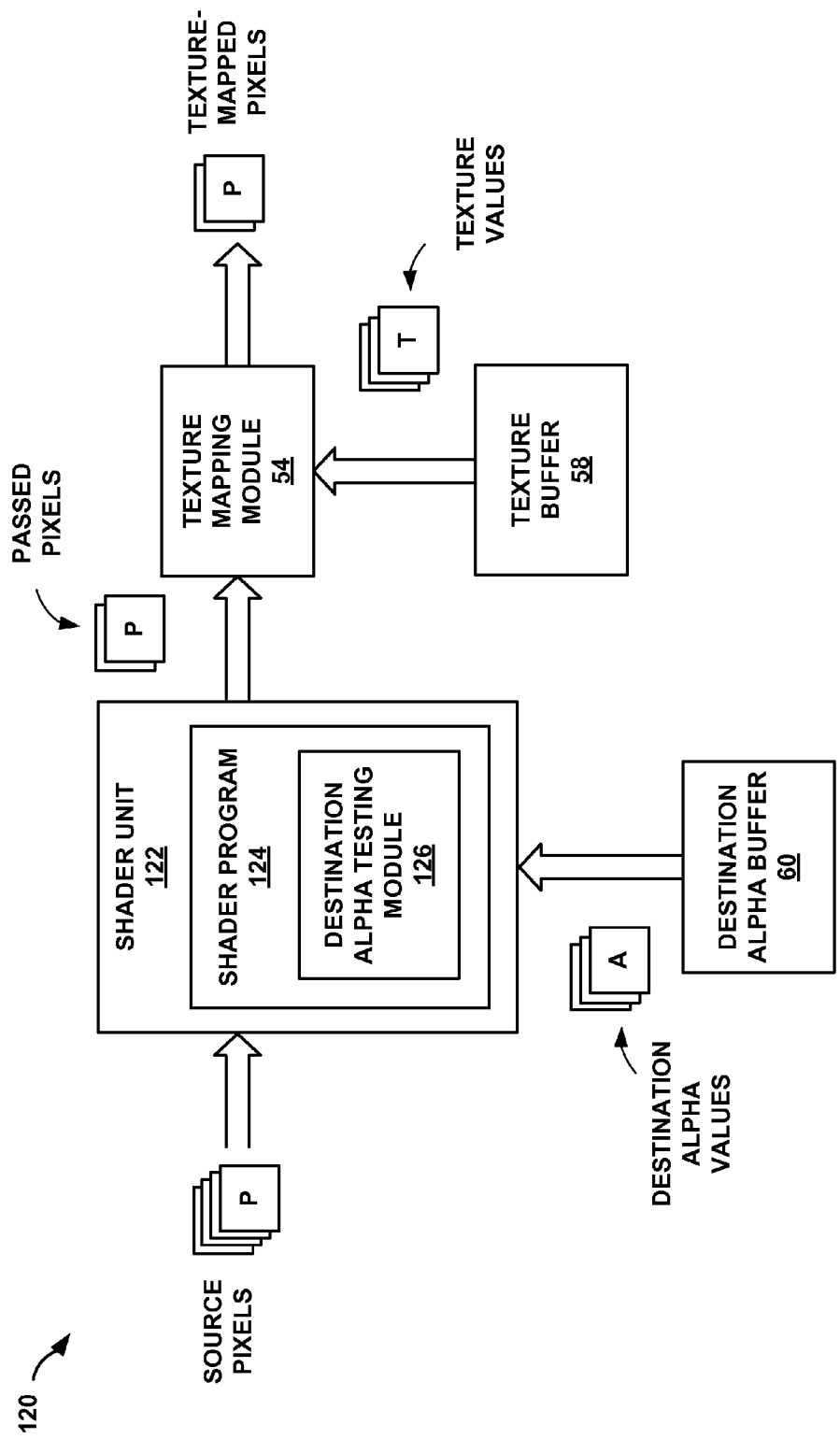
FIG. 11 is a block diagram illustrating an example pixel processing pipeline that uses a programmable shader unit to perform destination alpha testing according to the selective texture value retrieval techniques of this disclosure.

FIG. 11 is a block diagram illustrating an example pixel processing pipeline 120 that uses a programmable shader unit to perform destination alpha testing according to the selective texture value retrieval techniques of this disclosure. Pixel processing pipeline 120 includes a programmable shader unit 122, a texture mapping module 54, a texture buffer 58 and a destination alpha buffer 60. In the example pixel processing pipeline 120 of FIG. 11, texture mapping module 54 is implemented as a fixed function hardware unit while destination alpha testing module 126 is implemented in a programmable shader unit.

As shown in FIG. 11, the architecture of pixel processing pipeline 120 is similar to that of pixel processing pipeline 50 shown in FIG. 3 except that destination alpha testing module 52 has been replaced by shader unit 122, which implements a destination alpha test. Similarly numbered components in FIGS. 3 and 11 have the same or similar functionality and construction. Accordingly, in the interest of brevity and to avoid redundancy, the operation and construction of these shared components will not be described in further detail.

Shader unit 122 may include one or more processing elements that are configured to execute a shader program 124. In cases where shader unit 122 includes a plurality of processing elements, each processing element may be configured to, in some examples, execute shader program 124 in parallel with the other processing elements. In some examples, the processing elements in shader unit 122 may form a parallel single instruction, multiple data (SIMD) pipeline commonly found in modern GPUs.

Shader program 124 may include program instructions that are stored in an instruction memory or cache associated with shader unit 122. Shader program 124 may be compiled on a host CPU, e.g., CPU 6 in FIG. 1, by a user software application, a GPU driver, or another service executing on the host, and the compiled version of shader program 124 may be downloaded onto the shader unit 122 for execution.

Destination alpha testing module 126 may perform any of the functions attributed to the various destination alpha testing modules described in this disclosure. For example, destination alpha testing module 126 may perform destination alpha tests on source pixels and selectively discard individual source pixels prior to texture mapping module 54 based on results of the destination alpha test.

Figure 12:
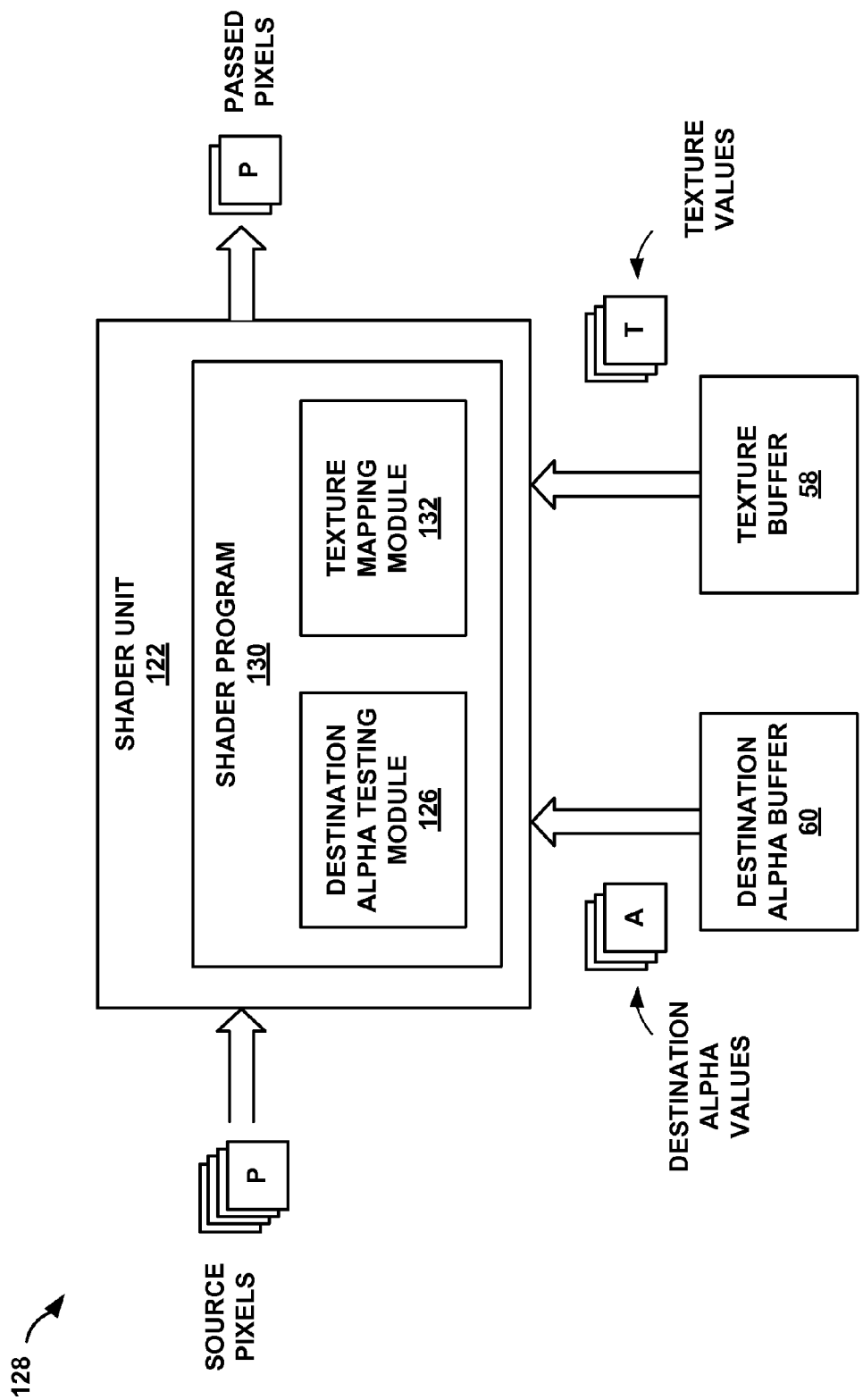
FIG. 12 is a block diagram illustrating another example pixel processing pipeline that uses a programmable shader unit to perform destination alpha testing and texture mapping according to the selective texture value retrieval techniques of this disclosure.

FIG. 12 is a block diagram illustrating another example pixel processing pipeline 128 that uses a programmable shader unit to perform destination alpha testing and texture mapping according to the selective texture value retrieval techniques of this disclosure. Pixel processing pipeline 128 includes a shader unit 122, a texture buffer 58 and a destination alpha buffer 60. As shown in FIG. 12, the architecture of pixel processing pipeline 128 is similar to that of pixel processing pipeline 120 shown in FIG. 11 except that texture mapping module 54 has been implemented on a programmable shader unit rather than as part of a fixed function pipeline stage. Similarly numbered components in FIGS. 11 and 12 have the same or similar functionality and construction. Accordingly, in the interest of brevity and to avoid redundancy, the operation and construction of these shared components will not be described in further detail.

Shader unit 122 includes a shader program 130, which in turn includes destination alpha testing module 126 and texture mapping module 132. Destination alpha testing module 126 may perform any of the functions attributed to the various destination alpha testing modules of this disclosure. Similarly, texture mapping module 132 may perform any of the functions attributed to the various texture mapping modules of this disclosure. When shader unit 122 receives a source pixel, shader unit 122 may first execute destination alpha testing module 126 to determine whether the source pixel should be discarded. If destination alpha testing module 126 determines that the source pixel should be discarded, then shader unit 122 discards the pixel and texture mapping module 132 is not executed with respect to the source pixel. On the other hand, if destination alpha testing module 126 determines that the source pixel should not be discarded, then texture mapping module 132 is executed with respect to the source pixel to perform texture mapping for the source pixel. The resulting texture-mapped source pixel is passed onto one or more subsequent processing stages.

Figure 13:
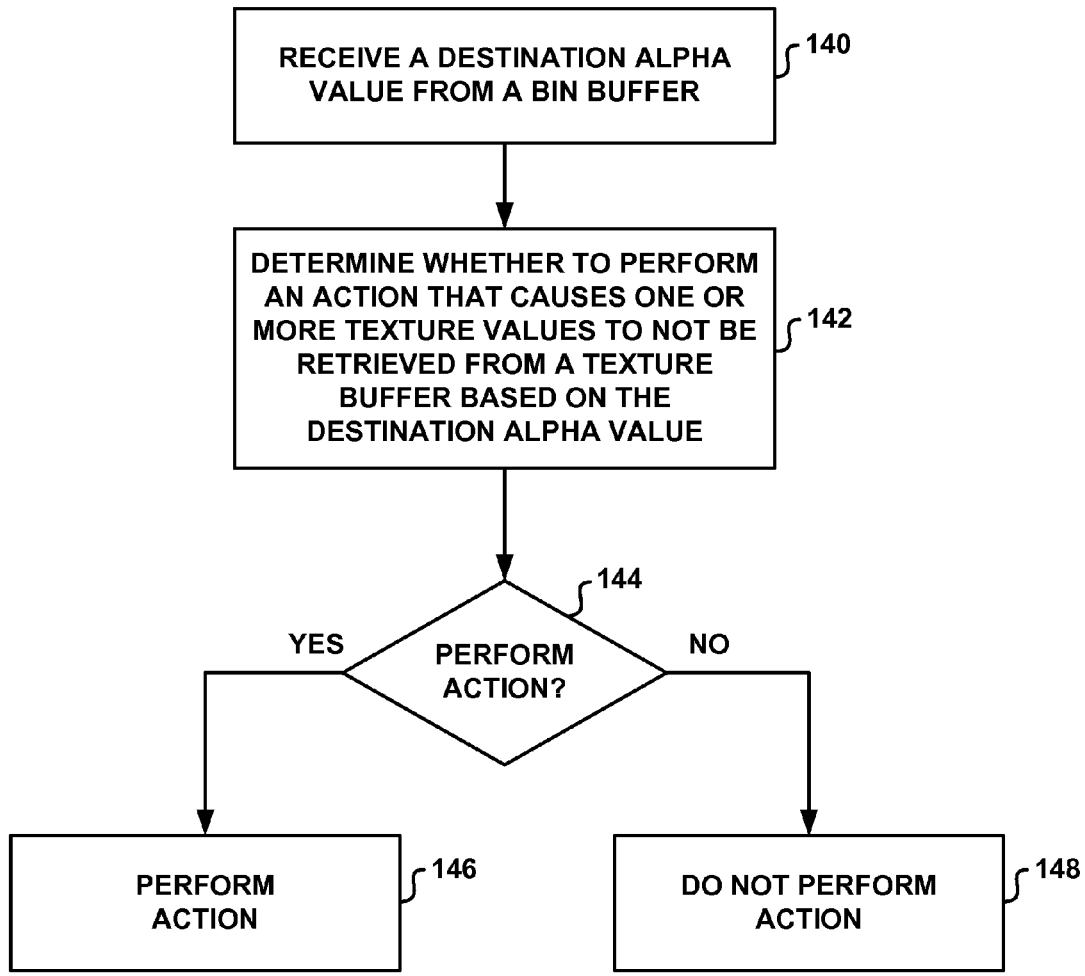
FIG. 13 is a flow diagram illustrating an example technique for selectively retrieving texture values for a source pixel based on a destination alpha value according to this disclosure.

FIG. 13 is a flow diagram illustrating an example technique for selectively retrieving texture values for a source pixel based on a destination alpha value according to this disclosure. In some examples, the technique illustrated in FIG. 13 may be implemented in any of the systems or components shown in FIGS. 1-12. Destination alpha testing module 52 retrieves a destination alpha value from bin buffer 64 (140). The destination alpha value may be generated by destination alpha determination module 56 in response to processing a first pixel associated with a first primitive. Destination alpha testing module 52 determines whether to perform an action that causes one or more texture values for a second pixel to not be retrieved from a texture buffer (142). The second pixel may be associated with a second primitive different than the first primitive. The second pixel may have the same pixel location as the pixel location of the first pixel.

In response to determining to perform the action (144—YES), destination alpha testing module 52 performs the action that causes the one or more texture values for the second pixel to not be retrieved from the buffer (146). For example, destination alpha testing module 52 discards the second pixel prior to the pixel being processed by a texture mapping stage 54 of a pixel processing pipeline 50. On the contrary, in response to determining to not perform the action (144—NO), destination alpha testing module 52 does not perform the action that causes the one or more texture values for the second pixel to not be retrieved from a buffer (148). For example, destination alpha testing module 52 may pass the second pixel onto a set of one or more processing stages, one of which may include a texture mapping stage 54.

In further examples, the action that causes the one or more texture values for the second pixel to not be retrieved from the buffer may be an action that causes texture mapping to not be performed for the second pixel. In additional examples, the action that causes the one or more texture values for the second pixel to not be retrieved from the buffer may be an action that asserts a control signal that causes the texture values to not be retrieved for the second pixel. For example, the control signal may cause another processing stage within pixel processing pipeline to discard the pixel. As another example, the control signal may enable or disable a texture mapping stage for a particular pixel within the pixel processing pipeline. In more examples, the action that causes the one or more texture values for the second pixel to not be retrieved from the buffer may be an action that sets a texture mapping disable attribute for the second pixel to a value that causes texture mapping to be disabled for the pixel.

In additional examples, destination alpha testing module 52 may retrieve the destination alpha value from bin buffer 64 via a first communication interface, and the one or more texture values may be retrieved from texture buffer 58 via a second communication interface. In such examples, the first communication interface may, in some examples, have a bandwidth that is greater than the second communication interface.

Bin buffer 64 may, in some examples, store pixel data for a subset of the destination pixels stored in frame buffer 64. For example, the subset of destination pixels stored in bin buffer 64 may correspond to a destination pixel range associated with a particular rendering pass as part of a bin rendering technique. Bin buffer 64 may be configured to receive a read request that includes a memory address that specifies a particular storage slot in bin buffer, and to return the data stored in that storage slot. The storage slot may correspond to a particular destination pixel associated with the current rendering pass. In some examples, during a particular rendering pass, each memory address for bin buffer 64 corresponds to a unique destination pixel within the destination pixel range for the particular rendering pass.

In some examples, a graphics image to be rendered may include a plurality of destination pixels, and the graphics processor may be configured to render the graphics image in a plurality of rendering passes, each of the rendering passes being associated with a respective subset of the destination pixels. In such examples, for each rendering pass, the bin buffer may store pixel data for a subset of destination pixels associated with the respective rendering pass. In additional examples, a capacity of the bin buffer may be less than a minimum capacity needed to store pixel data for all of the plurality of destination pixels associated with the graphics image. In further examples, the individual subsets of pixels associated with each rendering pass may be predetermined subsets of pixels.

Figure 14:
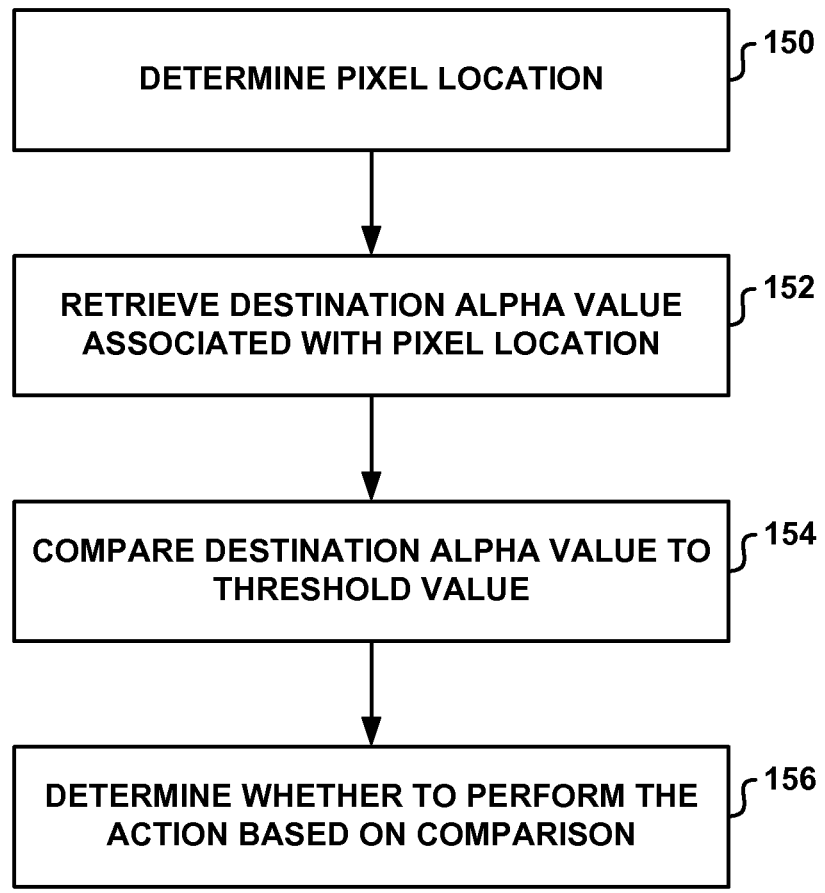
FIG. 14 is a flow diagram illustrating an example technique for performing a destination alpha test which may be used to implement the technique shown in FIG. 13.

FIG. 14 is a flow diagram illustrating an example technique for performing a destination alpha test which may be used to implement the technique shown in FIG. 13. In some examples, the technique shown in FIG. 14 may be used to implement process box 142 in FIG. 13. Destination alpha testing module 52 determines a pixel location associated with a received source pixel (150). Destination alpha testing module 52 retrieves a destination alpha value associated with the pixel location from destination alpha buffer 60 (152). Destination alpha testing module 52 compares the destination alpha value to a threshold value (154). Destination alpha testing module 52 determines whether to perform the action that causes the one or more texture values for the second pixel to not be retrieved from the buffer based on a result of the comparison (156).

Figure 15:
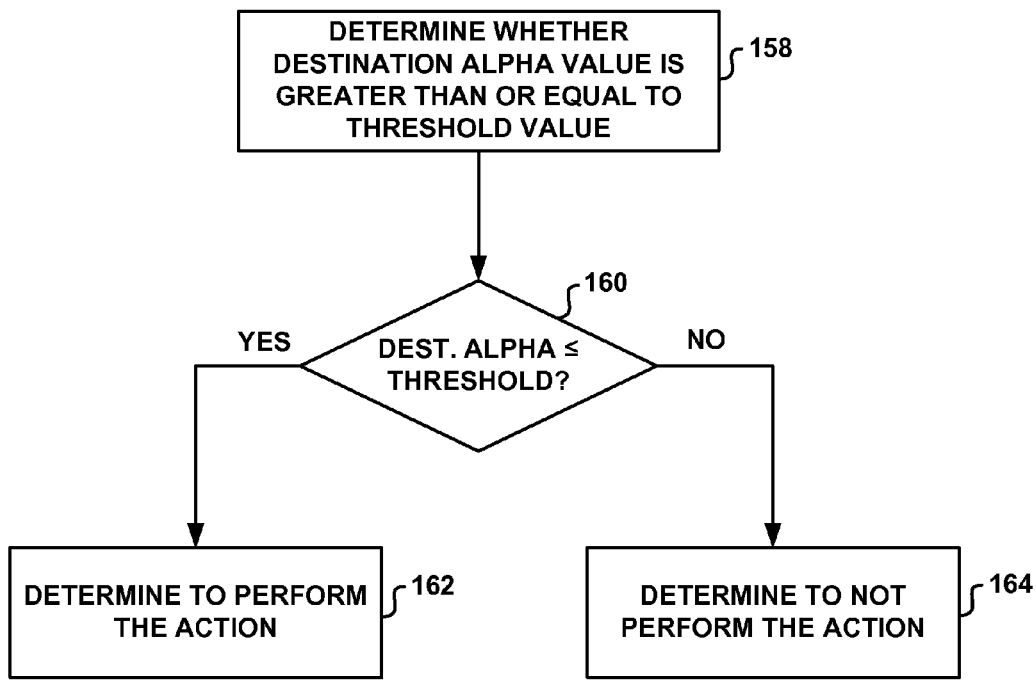
FIG. 15 is a flow diagram illustrating an example technique for comparing a destination alpha value to a threshold that may be used to implement the technique shown in FIG. 14.

FIG. 15 is a flow diagram illustrating an example technique for comparing a destination alpha value to a threshold that may be used to implement the technique shown in FIG. 14. In some examples, the technique shown in FIG. 14 may be used to implement process box 156 in FIG. 14. Destination alpha testing module 52 determines whether a destination alpha value is less than or equal to a threshold value (158). If the destination alpha value is less than or equal to a threshold value (160—YES), destination alpha testing module 52 determines to perform the action that causes the one or more texture values for the second pixel to not be retrieved from the buffer (162). For example, destination alpha testing module 52 may discard the source pixel prior to the texture mapping stage of a pixel processing pipeline. On the contrary, if the destination alpha value is not less than or equal to a threshold value (160—NO), determines to not perform the action that causes the one or more texture values for the second pixel to not be retrieved from the buffer (164). For example, destination alpha testing module 52 may pass the pixel onto one or more subsequent processing stages, one of which may include a texture mapping stage.

Figure 16:
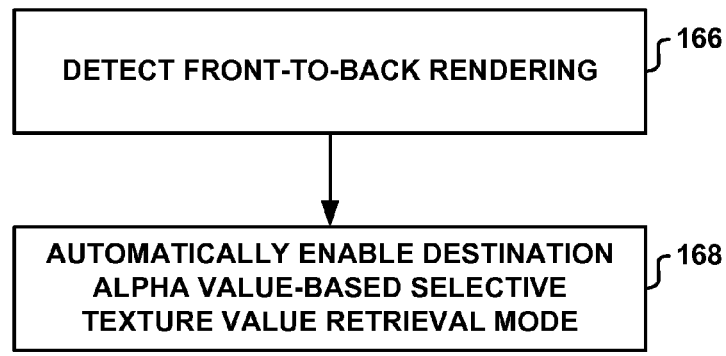
FIG. 16 is a flow diagram illustrating an example technique for automatically enabling a destination alpha value-based selective texture value retrieval rendering mode according to this disclosure.

FIG. 16 is a flow diagram illustrating an example technique for automatically enabling a destination alpha value-based selective texture value retrieval rendering technique according to this disclosure. The technique in FIG. 16 may be implemented for example in a GPU driver, such as, e.g., GPU driver 28 shown in FIG. 2. GPU driver 28 may detect that a front-to-back rendering mode has been enabled (166). For example, GPU driver 28 may detect that software application 24 has configured an alpha blending module in GPU 12 to perform alpha blending using front-to-back alpha blending equations. In response to the detection, GPU driver 28 may automatically enable a destination alpha based-selective texture value retrieval rendering mode for GPU 12 (168). The destination alpha based-selective texture value retrieval rendering mode may render primitives according to the techniques shown in FIG. 13, for example.

As already discussed above, the destination alpha testing techniques of this disclosure may be particularly useful in a "binning" environment where multiple surfaces that may overlap are composited into a single surface. In a binning environment, the limiting factors for compositing tend to be due to the reading and writing of the textures stored in off-chip "System Memory." Meanwhile, the reads and writes of the bin buffer are essentially "free" in terms of bandwidth. To composite a set of surfaces, the surfaces may be processed in a "front-to-back" order and a destination alpha value may be maintained. Once a pixel becomes opaque (e.g., either because the sum of transparencies block all further light transmission or because an opaque pixel is rendered), in some examples, the destination alpha value will become equal to "0," which may trigger the destination alpha testing module to discard any subsequent source pixels that are processed for the screen location.

Although z-buffering techniques may be used to reduce compositing bandwidth by discarding source pixels that are behind other source pixels in the same pixel location, such techniques do not properly render surfaces when the pixels have per-pixel source alpha values, which essentially allow overlapping pixels to be translucent. The destination alpha value-based selective texture value retrieval techniques of this disclosure, however, may reduce compositing bandwidth even when all surfaces have per-pixel source alpha values, thereby providing a more robust bandwidth reduction mechanism.

In some examples, the destination alpha testing techniques of this disclosure may be selectively enabled in cases where such techniques are particularly useful, e.g., when compositing window surfaces. In further examples, the destination alpha testing techniques may be enabled by a graphics driver and/or by the graphics processor without the compositor necessarily being aware that such a step is taking pace. For example, the driver and/or graphics processor may detect that the user application is attempting to composite surfaces in a front-to-back manner, and automatically enable the destination alpha testing techniques of this disclosure in response to such a detection. For example, the driver and/or graphics processor may detect that the alpha blending module has been set to a "front-to-back" blending function, and that several surface drawing commands have been called by the software, and automatically enable the destination alpha testing techniques of this disclosure.

The destination alpha testing techniques of this disclosure may provide one or more advantages over other non-destination alpha value-based techniques for reducing texture value retrieval bandwidth. For example, one technique is to tessellate and render only the surface "above" and including the topmost opaque surface. This technique, however, fails when all surfaces are transparent or have per-pixel alpha. Another technique for reducing bandwidth includes assigning a 'Z' to each surface and using the Z-value to avoid rendering surfaces underneath opaque surfaces. Again, this fails in a per-pixel alpha environment. Yet another technique for reducing bandwidth includes shader-based rendering of all surfaces in one pass with a per-surface, per-pixel alpha test. This works, but requires a significant change in the application. It also takes more shader horsepower and runs out of steam once the number of surfaces becomes large or the shape of the surfaces differ from rectangular.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

The invention claimed is:

1. A method comprising:
   rasterizing, with a rasterization block included in a graphics pipeline of a graphics processor, a first primitive to generate one or more source pixels that correspond to the first primitive, the one or more source pixels that correspond to the first primitive including a first source pixel;
   rasterizing, with the rasterization block, a second primitive different than the first primitive to generate one or more source pixels that correspond to the second primitive, the one or more source pixels that correspond to the second primitive including a second source pixel;
   retrieving, with a pixel processing pipeline included in the graphics pipeline of the graphics processor, a destination alpha value from a bin buffer, the destination alpha value being generated in response to processing the first source pixel generated by the rasterization block and associated with the first primitive;
   determining, with the pixel processing pipeline and based on the destination alpha value, whether to perform an action that causes one or more texture values for the second source pixel generated by the rasterization block to not be retrieved from a texture buffer, the second source pixel being associated with the second primitive, wherein the graphics processor and the bin buffer reside on a first microchip, and wherein the texture buffer resides on a second microchip different than the first microchip; and
   evaluating the destination alpha value to determine if a condition is satisfied; if the condition is satisfied, performing, with the pixel processing pipeline, the action that causes the one or more texture values for the second source pixel to not be retrieved from the texture buffer.

2. The method of claim 1,
   wherein determining whether to perform the action comprises determining whether to discard the second source pixel from the pixel processing pipeline prior to the second source pixel arriving at a texture mapping stage of the pixel processing pipeline based on the destination alpha value, and
   wherein performing the action comprises discarding the second source pixel from the pixel processing pipeline prior to the second source pixel arriving at a texture mapping stage of the pixel processing pipeline in response to determining to discard the second source pixel based on the destination alpha value.

3. The method of claim 2, further comprising:
   passing the second source pixel onto a set of one or more processing stages that includes a texture mapping stage in response to determining to not discard the second source pixel based on the destination alpha value.

4. The method of claim 1, wherein the action is a first action, the method further comprising:
   performing a second action that causes the one or more texture values for the second source pixel to be retrieved from the texture buffer in response to determining to not perform the first action.

5. The method of claim 1, wherein determining whether to perform the action comprises:
   comparing the destination alpha value to a threshold value; and
   determining whether to perform the action based on a result produced by comparing the destination alpha value to the threshold value.

6. The method of claim 5, wherein comparing the destination alpha value to the threshold value comprises determining whether the destination alpha value is less than or equal to the threshold value.

7. The method of claim 6,
   wherein performing the action comprises performing the action that causes the one or more texture values for the second source pixel to not be retrieved from the texture buffer in response to determining that the destination alpha value is less than or equal to the threshold value, and
   wherein the method further comprises performing an action that causes the one or more texture values for the second source pixel to be retrieved from the texture buffer in response to determining that the destination alpha value is not less than or equal to the threshold value.

8. The method of claim 5, wherein the threshold value is a configurable threshold value.

9. The method of claim 1,
   wherein retrieving the destination alpha value from the bin buffer comprises retrieving the destination alpha value from the bin buffer via a first communication interface, and
   wherein the graphics processor is configured to retrieve the one or more texture values from the texture buffer via a second communication interface different than the first communication interface.

10. The method of claim 9, wherein the first communication interface has a bandwidth that is greater than a bandwidth of the second communication interface.

11. The method of claim 1, wherein the bin buffer stores a subset of data contained in a frame buffer.

12. The method of claim 1, wherein a graphics image comprises a plurality of destination pixels, wherein the graphics processor is configured to render the graphics image in a plurality of rendering passes, each of the rendering passes being associated with a respective subset of the destination pixels, wherein a capacity of the bin buffer is less than a minimum capacity needed to store pixel data for all of the plurality of destination pixels associated with the graphics image, and wherein, for each rendering pass, the bin buffer stores pixel data for a subset of destination pixels associated with the respective rendering pass.

13. The method of claim 1, wherein determining whether to perform the action comprises:
determining, based on the destination alpha value and with one of a stencil testing block or a z/stencil testing block, whether to perform the action that causes the one or more texture values for the second source pixel to not be retrieved from the texture buffer.

14. The method of claim 1, wherein determining whether to perform the action comprises:
determining, based on the destination alpha value and with a shader program executing on a shader unit, whether to perform the action that causes the one or more texture values for the second source pixel to not be retrieved from the texture buffer.

15. The method of claim 1, wherein determining whether to perform the action comprises:
determining, based on the destination alpha value, whether a destination pixel that corresponds to the second source pixel is opaque due to one or more previously processed source pixels that correspond to the destination pixel.

16. The method of claim 1, wherein the second source pixel is associated with a pixel location, and wherein the destination alpha value for the second source pixel is a value indicative of an opacity of a destination pixel associated with the pixel location, the opacity of the destination pixel being determined at least in part by one or more previously processed source pixels associated with the pixel location.

17. A graphics processing device comprising:
a rasterization block configured to rasterize a first primitive to generate one or more source pixels that correspond to the first primitive, and rasterize a second primitive different than the first primitive to generate one or more source pixels that correspond to the second primitive, the one or more source pixels that correspond to the first primitive including a first source pixel, the one or more source pixels that correspond to the second primitive including a second source pixel; and
a destination alpha testing module configured to retrieve a destination alpha value from a bin buffer, the destination alpha value being generated in response to processing the first source pixel generated by the rasterization block and associated with the first primitive, the destination alpha testing module being further configured to determine, based on the destination alpha value, whether to perform an action that causes one or more texture values for the second source pixel generated by the rasterization block to not be retrieved from a texture buffer, and to evaluate the destination alpha value to determine if a condition is satisfied; if the condition is satisfied, to perform the action that causes the one or more texture values for the second source pixel to not be retrieved from the texture buffer, the second source pixel being associated with the second primitive,
wherein the destination alpha testing module is included in a pixel processing pipeline, wherein the rasterization block and the pixel processing pipeline are included in a graphics pipeline of the graphics processing device, wherein the graphics processing device and the bin buffer reside on a first microchip, and wherein the texture buffer resides on a second microchip different than the first microchip.

18. The device of claim 17, wherein the destination alpha testing module is further configured to determine whether to discard the second source pixel from the pixel processing pipeline prior to the second source pixel arriving at a texture mapping stage of the pixel processing pipeline based on the destination alpha value, and to discard the second source pixel from the pixel processing pipeline prior to the second source pixel arriving at a texture mapping stage of the pixel processing pipeline in response to determining to discard the second source pixel based on the destination alpha value.

19. The device of claim 18, wherein the destination alpha testing module is further configured to pass the second source pixel onto a set of one or more processing stages that includes a texture mapping stage in response to determining not to discard the second source pixel based on the destination alpha value.

20. The device of claim 17, wherein the action is a first action, and wherein the destination alpha testing module is further configured to perform a second action that causes the one or more texture values for the second source pixel to be retrieved from the texture buffer in response to determining to not perform the first action.

21. The device of claim 17, wherein the destination alpha testing module is further configured to compare the destination alpha value to a threshold value, and determine whether to perform the action based on a result produced by comparing the destination alpha value to the threshold value.

22. The device of claim 21, wherein the destination alpha testing module is further configured to determine whether the destination alpha value is less than or equal to the threshold value.

23. The device of claim 22, wherein the destination alpha testing module is further configured to perform the action that causes the one or more texture values for the second source pixel to not be retrieved from the texture buffer in response to determining that the destination alpha value is less than or equal to the threshold value, and to perform an action that causes the one or more texture values for the second source pixel to be retrieved from the texture buffer in response to determining that the destination alpha value is not less than or equal to the threshold value.

24. The device of claim 21, wherein the threshold value is a configurable threshold value.

25. The device of claim 17,
wherein the destination alpha testing module is further configured to retrieve the destination alpha value from the bin buffer via a first communication interface, and
wherein the graphics processing device is configured to retrieve the one or more texture values from the texture buffer via a second communication interface different than the first communication interface.

26. The device of claim 25, wherein the first communication interface has a bandwidth that is greater than a bandwidth of the second communication interface.

27. The device of claim 17, wherein the bin buffer stores a subset of data contained in a frame buffer.

28. The device of claim 17, wherein a graphics image comprises a plurality of destination pixels, wherein the graphics processing device is configured to render the graphics image in a plurality of rendering passes, each of the rendering passes being associated with a respective subset of the destination pixels, wherein a capacity of the bin buffer is less than a minimum capacity needed to store pixel data for all of the plurality of destination pixels associated with the graphics image, and wherein, for each rendering pass, the bin buffer stores pixel data for a subset of destination pixels associated with the respective rendering pass.

29. The device of claim 17, wherein the destination alpha testing module comprises:

one of a stencil testing block or a z/stencil testing block configured to determine, based on the destination alpha value, whether to perform the action that causes the one or more texture values for the second source pixel to not be retrieved from the texture buffer.

30. The device of claim 17, wherein the destination alpha testing module comprises:
a shader unit configured to execute a shader program that determines, based on the destination alpha value, whether to perform the action that causes the one or more texture values for the second source pixel to not be retrieved from the texture buffer.

31. The device of claim 17, wherein the destination alpha testing module is further configured to determine, based on the destination alpha value, whether a destination pixel that corresponds to the second source pixel is opaque due to one or more previously processed source pixels that correspond to the destination pixel.

32. The device of claim 17, wherein the second source pixel is associated with a pixel location, and wherein the destination alpha value for the second source pixel is a value indicative of an opacity of a destination pixel associated with the pixel location, the opacity of the destination pixel being determined at least in part by one or more previously processed source pixels associated with the pixel location.

33. An apparatus comprising:
means for rasterizing a first primitive to generate one or more source pixels that correspond to the first primitive, the one or more source pixels that correspond to the first primitive including a first source pixel;
means for rasterizing a second primitive different than the first primitive to generate one or more source pixels that correspond to the second primitive, the one or more source pixels that correspond to the second primitive including a second source pixel;
means for retrieving a destination alpha value from a bin buffer, the destination alpha value being generated in response to processing the first source pixel generated by the means for rasterizing the first primitive and associated with the first primitive;
means for determining, based on the destination alpha value, whether to perform an action that causes one or more texture values for the second source pixel generated by the means for rasterizing the second primitive to not be retrieved from a texture buffer, the second source pixel being associated with the second primitive, wherein the means for rasterizing the first primitive and the bin buffer reside on a first microchip, and wherein the texture buffer resides on a second microchip different than the first microchip; and
means for evaluating the destination alpha value to determine if a condition is satisfied; if the condition is satisfied, performing the action that causes the one or more texture values for the second source pixel to not be retrieved from the texture buffer.

34. The apparatus of claim 33,
wherein the means for determining whether to perform the action comprises means for determining whether to discard the second source pixel from a pixel processing pipeline prior to the second source pixel arriving at a texture mapping stage of the pixel processing pipeline based on the destination alpha value, and
wherein the means for performing the action comprises means for discarding the second source pixel from the pixel processing pipeline prior to the second source pixel arriving at a texture mapping stage of the pixel processing pipeline in response to determining to discard the second source pixel based on the destination alpha value.

35. The apparatus of claim 34, further comprising:
means for passing the second source pixel onto a set of one or more processing stages that includes a texture mapping stage in response to determining not to discard the second source pixel based on the destination alpha value.

36. The apparatus of claim 33, wherein the second source pixel is associated with a pixel location, and wherein the destination alpha value for the second source pixel is a value indicative of an opacity of a destination pixel associated with the pixel location, the opacity of the destination pixel being determined at least in part by one or more previously processed source pixels associated with the pixel location.

37. The apparatus of claim 33,
wherein the means for retrieving the destination alpha value from the bin buffer comprises means for retrieving the destination alpha value from the bin buffer via a first communication interface, and
wherein the apparatus further comprises means for retrieving the one or more texture values from the texture buffer via a second communication interface different than the first communication interface.

38. The apparatus of claim 37, wherein the first communication interface has a bandwidth that is greater than a bandwidth of the second communication interface.

39. A non-transitory computer-readable medium comprising instructions that cause one or more processors to:
rasterize, with a rasterization block included in a graphics pipeline, a first primitive to generate one or more source pixels that correspond to the first primitive, the one or more source pixels that correspond to the first primitive including a first source pixel;
rasterize, with the rasterization block, a second primitive different than the first primitive to generate one or more source pixels that correspond to the second primitive, the one or more source pixels that correspond to the second primitive including a second source pixel;
retrieve a destination alpha value from a bin buffer, the destination alpha value being generated in response to processing the first source pixel generated by the rasterization block and associated with the first primitive;
determine, based on the destination alpha value, whether to perform an action that causes one or more texture values for the second source pixel generated by the rasterization block to not be retrieved from a texture buffer, the second source pixel being associated with the second primitive, wherein the graphics pipeline and the bin buffer reside on a first microchip, and wherein the texture buffer resides on a second microchip different than the first microchip; and
evaluate the destination alpha value to determine if a condition is satisfied; if the condition is satisfied, perform the action that causes the one or more texture values for the second source pixel to not be retrieved from the texture buffer.

40. The non-transitory computer-readable medium of claim 39,
wherein the instructions that cause the one or more processors to determine whether to perform the action comprise instructions that cause the one or more processors to determine whether to discard the second source pixel from a pixel processing pipeline prior to the second source pixel arriving at a texture mapping stage of the pixel processing pipeline based on the destination alpha value, and wherein the instructions that cause the one or more processors to perform the action comprises instructions that cause the one or more processors to discard the second source pixel from the pixel processing pipeline prior to the second source pixel arriving at a texture mapping stage of the pixel processing pipeline in response to determining to discard the second source pixel based on the destination alpha value.

41. The non-transitory computer-readable medium of claim 40, further comprising instructions that cause the one or more processors to:

pass the second source pixel onto a set of one or more processing stages that includes a texture mapping stage in response to determining not to discard the second source pixel based on the destination alpha value.

42. The non-transitory computer-readable medium of claim 39, wherein the second source pixel is associated with a pixel location, and wherein the destination alpha value for the second source pixel is a value indicative of an opacity of a destination pixel associated with the pixel location, the opacity of the destination pixel being determined at least in part by one or more previously processed source pixels associated with the pixel location.

43. The non-transitory computer-readable medium of claim 39, wherein the instructions that cause the one or more processors to retrieve the destination alpha value from the bin buffer comprise instructions that cause the one or more processors to retrieve the destination alpha value from the bin buffer via a first communication interface, and wherein the one or more processors is configured to retrieve the one or more texture values from the texture buffer via a second communication interface different than the first communication interface.

44. The non-transitory computer-readable medium of claim 43, wherein the first communication interface has a bandwidth that is greater than a bandwidth of the second communication interface.

* * * * *